(12) United States Patent
Baldwin et al.

(10) Patent No.: US 9,318,888 B1
(45) Date of Patent: Apr. 19, 2016

(54) THROUGH WALL ELECTRICAL AND LOW VOLTAGE CONNECTOR

(71) Applicants: Jeffrey Baldwin, Desert Hills, AZ (US); John Klein, Gilbert, AZ (US); Ryan Liebengood, Gilbert, AZ (US)

(72) Inventors: Jeffrey Baldwin, Desert Hills, AZ (US); John Klein, Gilbert, AZ (US); Ryan Liebengood, Gilbert, AZ (US)

( * ) Notice: Subject to any disclaimer, the term of this patent is extended or adjusted under 35 U.S.C. 154(b) by 0 days.

(21) Appl. No.: 14/531,784

(22) Filed: Nov. 3, 2014

Related U.S. Application Data

(63) Continuation-in-part of application No. 14/141,506, filed on Dec. 27, 2013.

(60) Provisional application No. 61/773,777, filed on Mar. 6, 2013, provisional application No. 61/749,211, filed on Jan. 4, 2013.

(51) Int. Cl.
   *H02B 1/40* (2006.01)
   *H02G 3/22* (2006.01)
   *H02G 3/38* (2006.01)
   *H02G 3/12* (2006.01)
   *H02G 1/00* (2006.01)

(52) U.S. Cl.
   CPC ............... *H02G 3/386* (2013.01); *H02G 1/00* (2013.01); *H02G 3/12* (2013.01)

(58) Field of Classification Search
   CPC ............. H02G 3/22; H02G 3/24; H02G 3/26; H02G 3/28; H02G 3/286; H02G 3/30; H02G 3/36; H02G 3/386; H02G 3/12; H02G 1/00
   USPC ............ 174/480, 481, 483, 505, 50, 53, 535, 174/559, 60, 650, 656, 68.1, 72 A, 152 G, 174/153 G; 220/3.2–3.9, 4.02; 248/68.1, 49
   See application file for complete search history.

(56) References Cited

U.S. PATENT DOCUMENTS

| | | | |
|---|---|---|---|
| D227,989 S | 7/1973 | Geisel | |
| 4,176,758 A | 12/1979 | Glick | |
| 4,612,412 A * | 9/1986 | Johnston | .......... 174/57 |
| D346,362 S | 4/1994 | Bouley | |
| 6,147,304 A * | 11/2000 | Doherty | .......... 174/481 |
| D478,872 S | 8/2003 | Heggem | |
| D493,773 S | 8/2004 | Hein | |
| 6,777,611 B2 * | 8/2004 | Ewald et al. | .......... 174/50 |
| 6,827,229 B2 | 12/2004 | Dinh et al. | |
| D502,687 S | 3/2005 | Sherman | |
| 7,170,015 B1 | 1/2007 | Roesch et al. | |
| 7,525,043 B1 * | 4/2009 | Gretz | .......... 174/50 |
| D596,154 S | 7/2009 | Rivkin | |
| 7,563,979 B1 | 7/2009 | Gretz | |
| 7,667,145 B2 | 2/2010 | Dinh | |
| D629,366 S | 12/2010 | Ericson et al. | |
| 7,897,870 B1 | 3/2011 | Gretz | |

(Continued)

OTHER PUBLICATIONS

U.S. Appl. No. 90/013,161, filed Mar. 13, 2014, Callahan et al.

*Primary Examiner* — Angel R Estrada
(74) *Attorney, Agent, or Firm* — Ryan Liebengood

(57) ABSTRACT

A through wall electrical device including a high voltage electrical box having a rear surface and a low voltage electrical box, an electrical receptacle or an electrical plug having a rear wall and positioned in the high voltage electrical box, and wherein the rear wall extends beyond the rear surface of the high voltage box.

16 Claims, 23 Drawing Sheets

(56) References Cited

U.S. PATENT DOCUMENTS

| | | | |
|---|---|---|---|
| 8,049,107 B2 * | 11/2011 | Dinh | 174/53 |
| 8,563,876 B1 | 10/2013 | Gretz | |
| 8,629,349 B2 * | 1/2014 | Martino et al. | 174/559 |
| 8,651,460 B2 | 2/2014 | Callahan et al. | |
| 8,659,895 B1 * | 2/2014 | Carlson et al. | 361/695 |
| 8,878,058 B2 * | 11/2014 | Wurms et al. | 174/50 |
| 8,975,518 B1 * | 3/2015 | Gretz | 174/53 |
| 2008/0142499 A1 | 6/2008 | Byrne | |
| 2012/0305868 A1 | 12/2012 | Callahan et al. | |

* cited by examiner

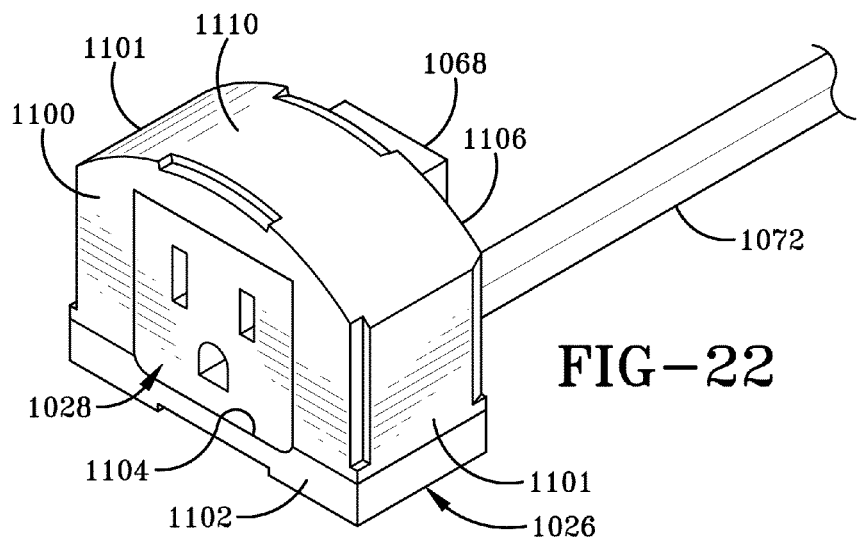
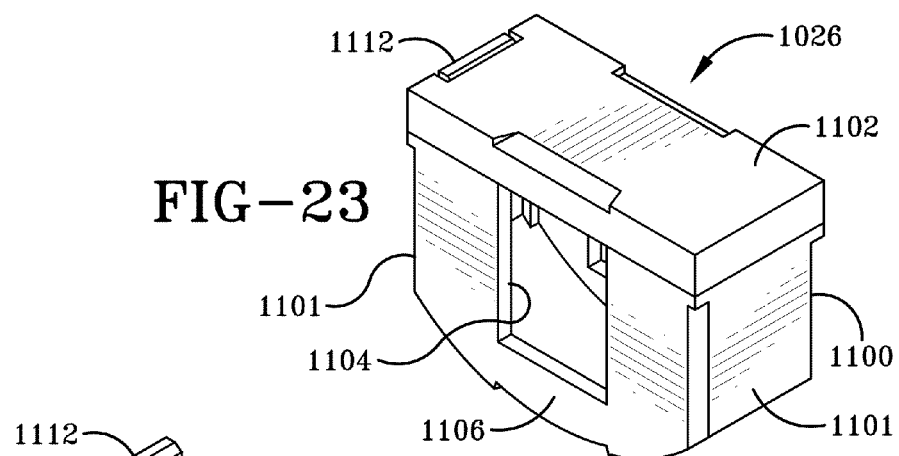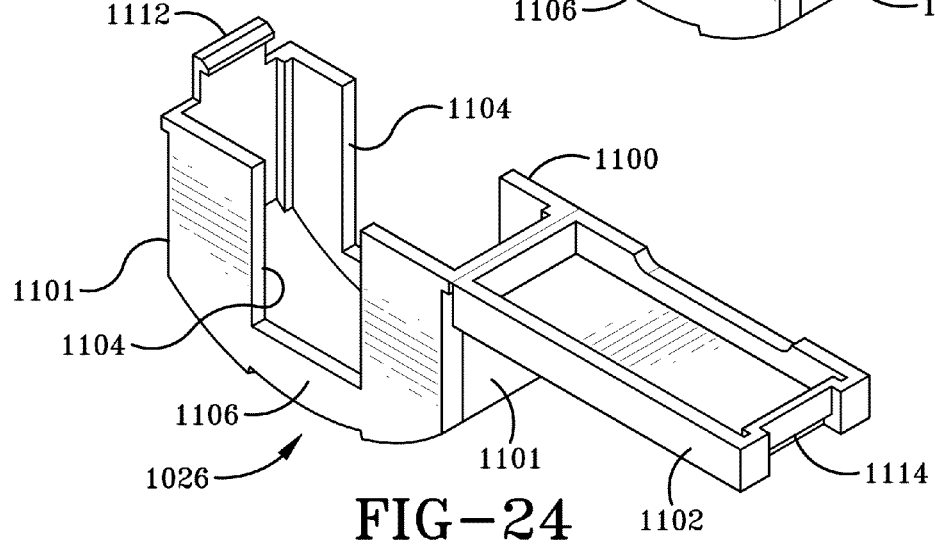

THROUGH WALL ELECTRICAL AND LOW VOLTAGE CONNECTOR

CROSS-REFERENCE TO RELATED APPLICATIONS

This application is a continuation-in-part of currently pending U.S. Utility patent application Ser. No. 14/141,506 to Baldwin et al., filed on Dec. 27, 2013, which is currently pending, which claims priority to U.S. Provisional Patent Application No. 61/749,211, filed on Jan. 4, 2013 to Baldwin et al., and also claims priority to U.S. Provisional Patent Application No. 61/773,777 to Baldwin et al., filed on Mar. 6, 2013, and the disclosures of which are hereby incorporated herein by reference.

BACKGROUND

1. Technical Field

Aspects of the present disclosure relate generally to electrical devices and more specifically to electrical devices which hide line voltage cables and a low voltage cable behind a wall for a more aesthetically pleasing appearance.

2. Background Art

Electrical cords and plugs are well known and are used to provide electrical current to a number of devices. Modern televisions are light enough to be hung on the wall, yet still need to be connected to an electrical outlet. In new construction, an electrical outlet can be located where a television will ultimately be mounted, yet the majority of households have electrical outlets near the floor. In these instances, the television electrical cable droops from the mounted television to reach the electrical outlet near the floor and creates an unsightly appearance. Further, DVD players, cable boxes, and similar devices which play through the television must be connected to the television with an HDMI cable or other suitable cable. These cables then must be run up the wall and further clutters the television's appearance.

SUMMARY

Aspects of this disclosure relate to a through wall cable device. In one aspect, a through wall electrical device includes a high voltage electrical box having a rear surface and a low voltage electrical box, an electrical receptacle or an electrical plug having a rear wall and positioned in the high voltage electrical box, and wherein the rear wall extends beyond the rear surface of the high voltage electrical box.

In an implementation, the electrical receptacle or the electrical plug may be secured within a receptacle retainer in the high voltage electrical box. The through wall electrical box may further include a mounting portion recessed from a front surface formed by a flange to secure the high voltage electrical box to a wall. The electrical receptacle may be a plurality of electrical receptacles.

In another aspect, a through wall electrical device includes an upper high voltage electrical box, an upper low voltage electrical box, a lower high voltage electrical box, and a lower low voltage electrical box, and a hollow tube connecting the upper low voltage electrical box and the lower low voltage electrical box.

In an implementation, the upper low voltage electrical box may further include a top wall having a cutout. The cutout may extend rearward at least partially above a low voltage electrical box outlet. The cutout may not be visible when the upper high voltage electrical box and the upper low voltage electrical boxes are installed. The upper low voltage electrical box may be clear. The upper high voltage electrical box may be clear. The upper low voltage electrical box and the upper high voltage electrical box are each half-round electrical boxes. The through wall electrical device may include a recessed mounting portion for securing the upper low voltage electrical box and the upper high voltage electrical box to a wall. The recessed mounting portions may be disconnected from a front surface flange. The through wall electrical device may include a faceplate securable to a flange of the upper high voltage electrical box and the upper low voltage electrical box. The faceplate may include a high voltage opening and a low voltage opening. The upper and lower high voltage electrical boxes may be removable without impacting the upper and lower low voltage electrical boxes. The upper high voltage electrical box may be positioned above the upper low voltage electrical box.

In an aspect, a method of providing a cable passage includes the steps of mounting an upper low voltage electrical box in an installation wall with a hollow tube positioned behind the installation wall, mounting a lower low voltage electrical box in the installation wall and connected to the hollow tube, mounting an upper high voltage electrical box in the installation wall, and mounting a lower high voltage electrical box in the installation wall.

In an implementation, the method may further include the step of inserting a cable through the upper and lower low voltage electrical boxes before installing the upper and lower high voltage electrical boxes. The method may include the step of connecting the lower high voltage electrical box to an electrical current source.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Embodiments of the present invention will hereinafter be described in conjunction with the appended drawings, where like designations denote like elements, and:

FIG. 22 is a perspective view of a receptacle and receptacle housing.

FIG. 23 is a perspective view of the receptacle housing in the closed position.

FIG. 24 is a perspective view of the receptacle housing in the open position.

DETAILED DESCRIPTION

This disclosure, its aspects and implementations, are not limited to the specific components or assembly procedures disclosed herein. Many additional components and assembly procedures known in the art consistent with the intended operation and assembly procedures for a through wall electrical device will become apparent for use with implementations of a through wall electrical device from this disclosure. Accordingly, for example, although particular components are disclosed, such components and other implementing components may comprise any shape, size, style, type, model, version, measurement, concentration, material, quantity, and/or the like as is known in the art for such implementing components, consistent with the intended operation of a through wall electrical device.

Figure 1:
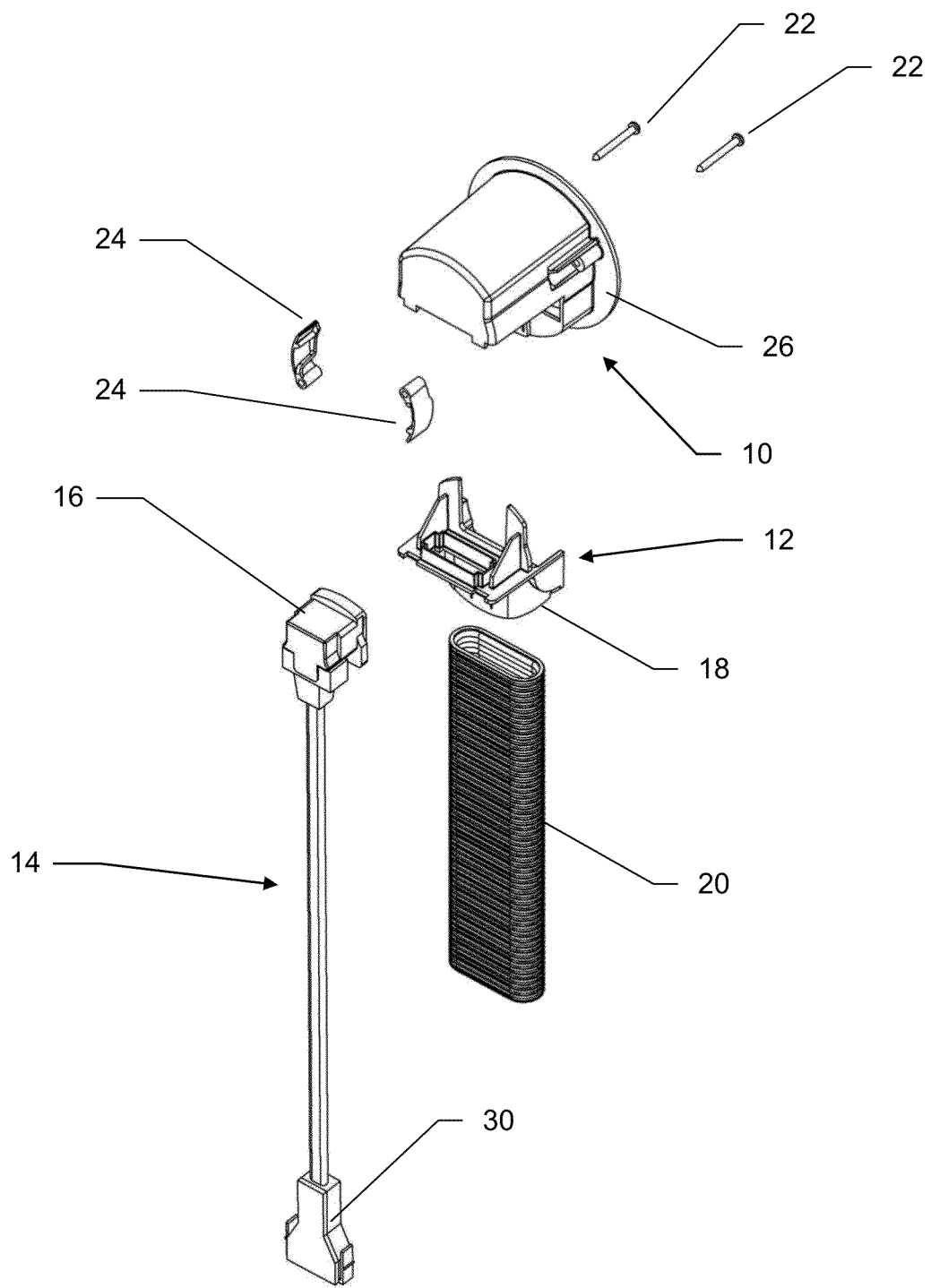
FIG. 1 is a rear exploded perspective view of the through wall cable device with various components.
Figure 2:
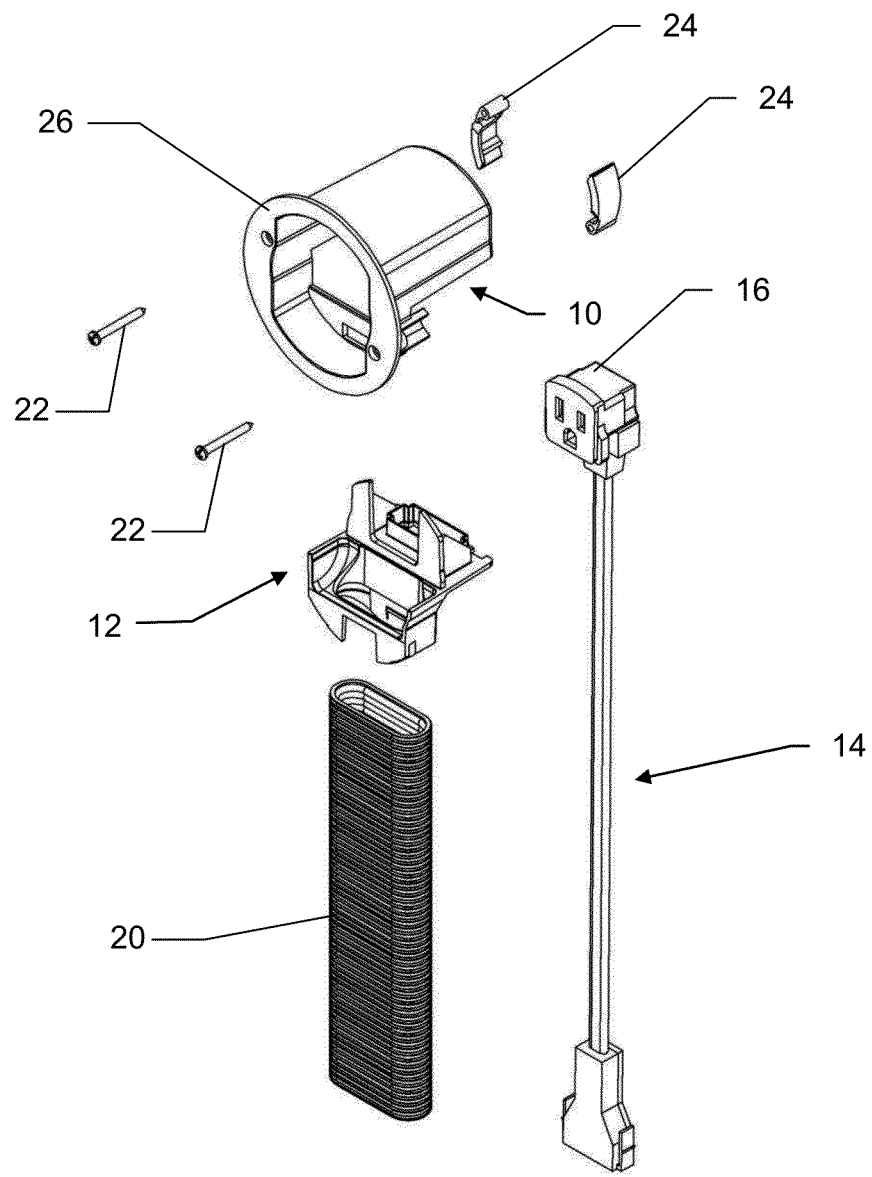
FIG. 2 is a front exploded perspective view of the through wall cable device with various components.

FIGS. 1 and 2 illustrate views of the upper electrical box 10 with an adapter 12 which fits within a bottom portion of upper electrical box 10. The upper electrical box 10 may be arranged to receive adapter 12 or directly receive the low voltage tube and electrical cable as will be discussed below in greater detail. In the illustrated aspect, adapter 12 snaps into an opening near the rear bottom of the upper electrical box 10. The adapter 12 provides a feature to secure an electrical cable 14 with an electrical outlet 16 specifically positioned within upper electrical box 10. In this arrangement, a television electrical plug or other suitable line voltage device may be connected without electrical cables being visible. The adapter 12 also includes a mounting portion 18 arranged to receive low voltage tube 20. Low voltage tube 20 connects to upper electrical box 10 such that the line voltage electrical cable 14 may pass through the wall separate from low voltage tube 20 to permit passage of both line voltage electrical cables and low voltage electrical cables behind a wall without concerns of violating electrical codes. As can be seen, line voltage electrical cable 14 may be a standard NM cable or any other suitable cable to meet code regulations. Adapter 12 may be discarded and replaced with a standard electrical box with a fixed side that low voltage hollow tube 20 can connect to directly. In another implementation, adapter 12 may be replaceable to provide a different shape/size to receive different shape/size hollow tubes as the user may select.

Referring to FIG. 2, adapter 12 is seen with separate openings for the line voltage electrical cable 14 with electrical outlet 16 and low voltage tube 20 such that the different cables are not in contact with one another after installation. Upper electrical box 10 includes a rearward extending portion for installation into a wall (not shown in this view). The upper electrical box 10 is inserted into the wall and screws 22 are rotated to rotate mounting flags 24 outward, thereby drawing the mounting flags forward towards the screws 22. Accordingly, the mounting flags 24 contact a rear surface of the mounting wall and assist with securing the upper electrical box on the wall with a front lip 26 of the upper electrical box contacting a front surface of the wall. Further, a gasket (not shown) may be secured between front lip 26 and the front surface of the mounting wall to further assist with sealing the electrical box and preventing air flow between the front side and rear side of the installation wall.

Figure 3:
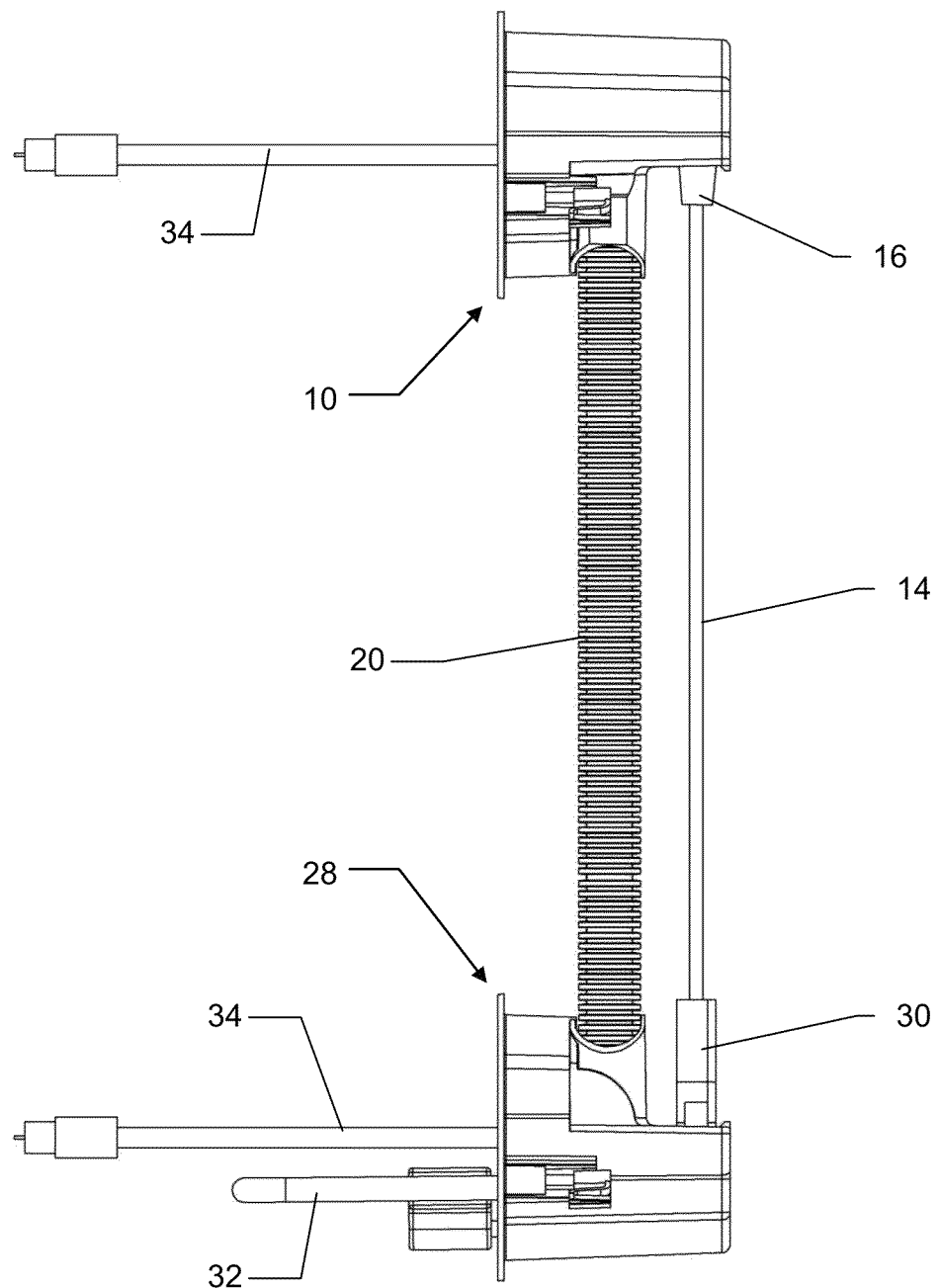
FIG. 3 is a right side view of the through wall cable device in a fully assembled orientation and both an electrical cable and a low voltage cable installed.
Figure 4:
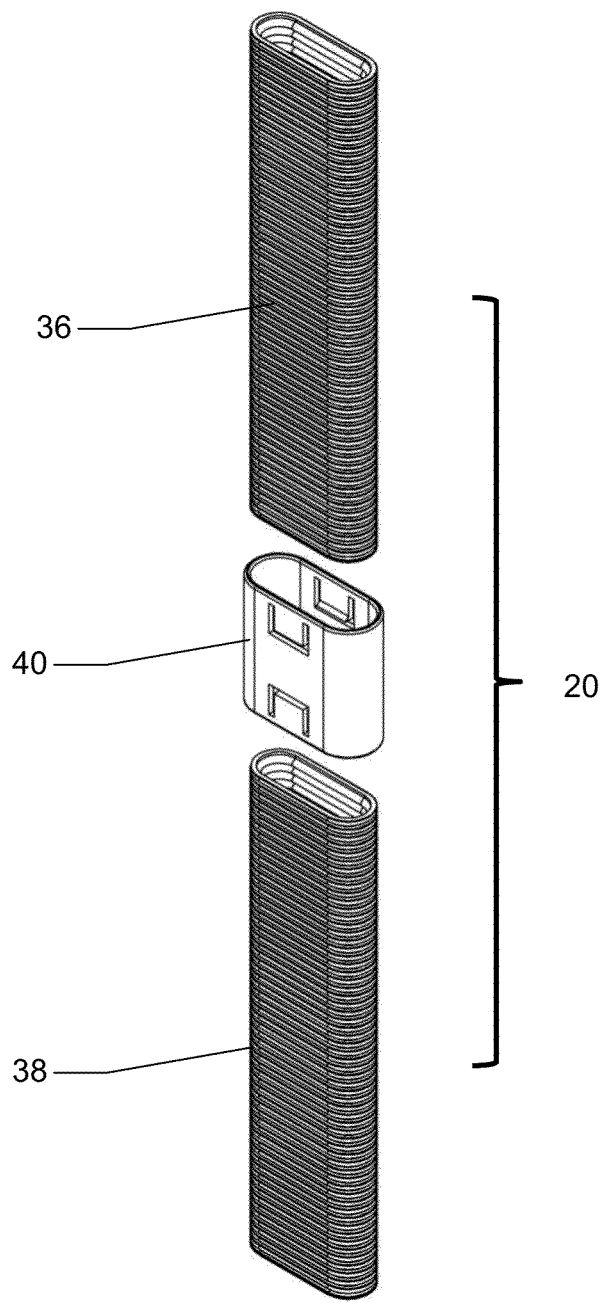
FIG. 4 is an exploded perspective view of the low voltage cable tube with a connector positioned between two separate pieces of low voltage cable tube.
Figures 5A, 5B, 5C:
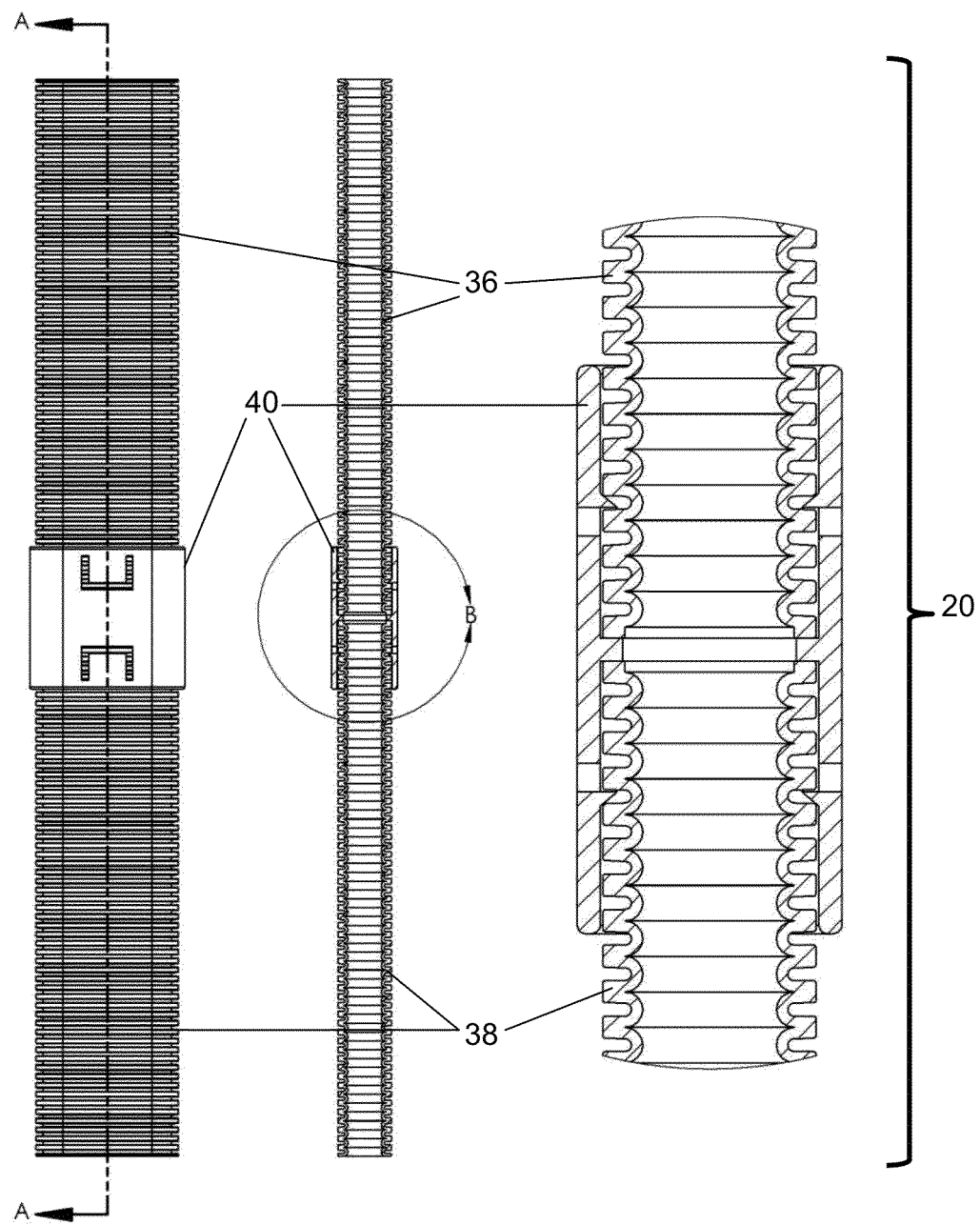
FIG. 5A is a front view of the low voltage cable tube with two pieces of low voltage cable tube aligned with a connector.
FIG. 5B is a sectional view of the low voltage cable tube taken generally along line A-A in FIG. 5A.
FIG. 5C is an enlarged view of the low voltage cable tube shown in FIG. 5B.

FIG. 3 illustrates a full through cable device with upper electrical box 10 and a lower electrical box 28 connected with low voltage cable tube 20 and high voltage electrical cable 14. Lower electrical box 28 may also include an adapter or the low voltage cable tube 20 and electrical cable 14 may connect directly to the lower electrical box 28. In this arrangement, electrical cable 14 may include a connector 30 which connects to lower electrical box 28 directly. Lower electrical box 28 may include an electrical outlet (similar to the upper electrical outlet) such that an electrical cord may be used to connect the lower electrical box to a conventional power source. Lower electrical box 28 may also include an electrical cable 32 which is positioned directly within or integral to the lower electrical box 28 such that a removable electrical cable is not needed to connect the lower electrical box 28 to a standard power source, thereby reducing manufacturing costs and additional components.

FIG. 3 also illustrates a low voltage cable 34 extending through the upper electrical box 10 and the lower electrical box 28 in addition to low voltage cable tube 20. Advantageously, low voltage cables 34 may be passed through a wall without the concern of contacting insulation or other debris which is positioned behind the mounting wall. Further, the low voltage tube allows the owner to run additional low voltage cables through the tube in a controlled manner without fish tape or other intrusive and difficult to operate tool. In a similar fashion, the cables can be removed, replaced, or changed without the removal of the through wall cable device for each cable change. In addition, the electrical cable 14 may be interchangeable to selectively provide multiple electrical outlets within upper electrical box 10 without removal of the entire through wall cable device.

FIGS. 4 and 5A through 5C illustrate low voltage cable tube 20 with an upper tube 36 and a lower tube 38 connected with a connector 40 to help form low voltage cable tube 20. In this arrangement, the upper tube 36 and lower tube 38 can be selectively tuned to a specific length to fit the specific installation requirement. The connector 40 may fit on the inside or outside of low voltage cable tube 20 and provide a secure connection to permit a smaller product for packaging and an easier device for installation. Further, the low voltage cable tube 20 may be generally oval or rectangular in shape to receive several low voltage cables without binding or installation difficulty.

Figure 6A:
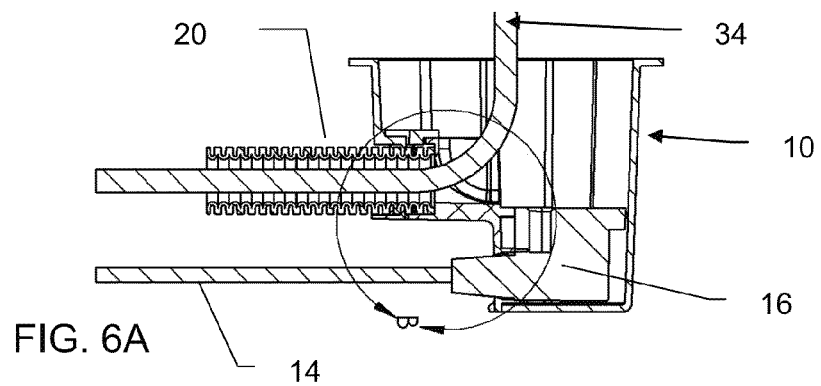
FIG. 6A is a sectional view of the through wall cable device with an electrical cable and a low voltage cable positioned within the upper electrical box taken generally about line A-A in FIG. 6B.
Figure 6B:
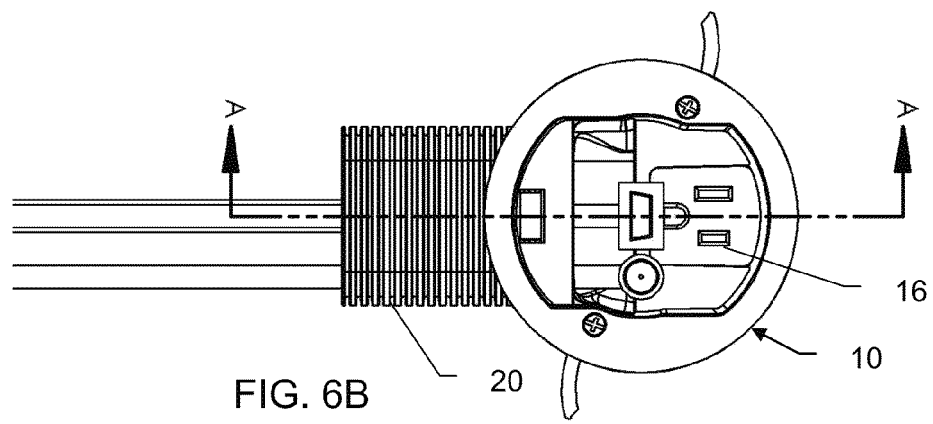
FIG. 6B is a front view of the through wall cable device with an electrical cable and a low voltage cable positioned within the upper electrical box.
Figure 6C:
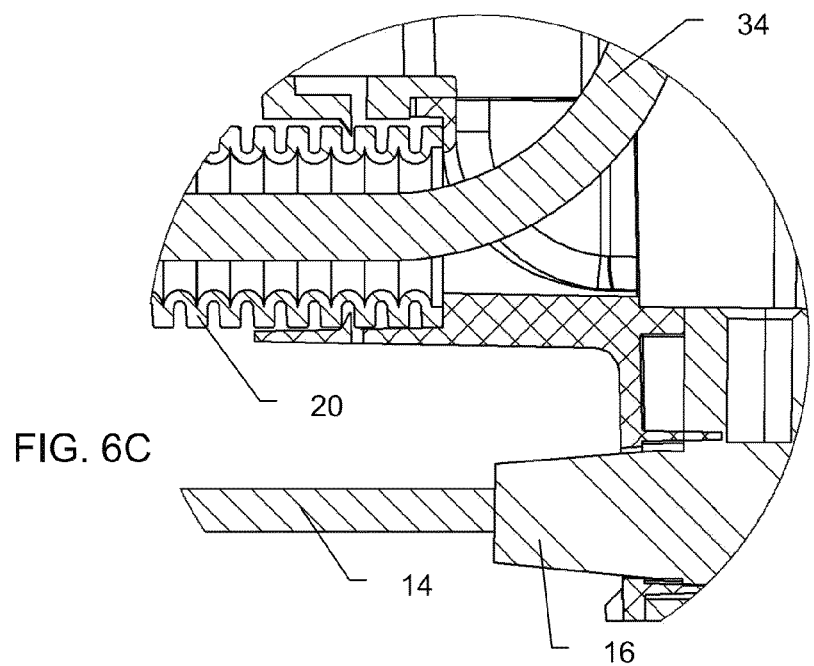
FIG. 6C is an enlarged sectional view of the through wall cable device of encircled portion B shown in FIG. 6A
Figure 7:
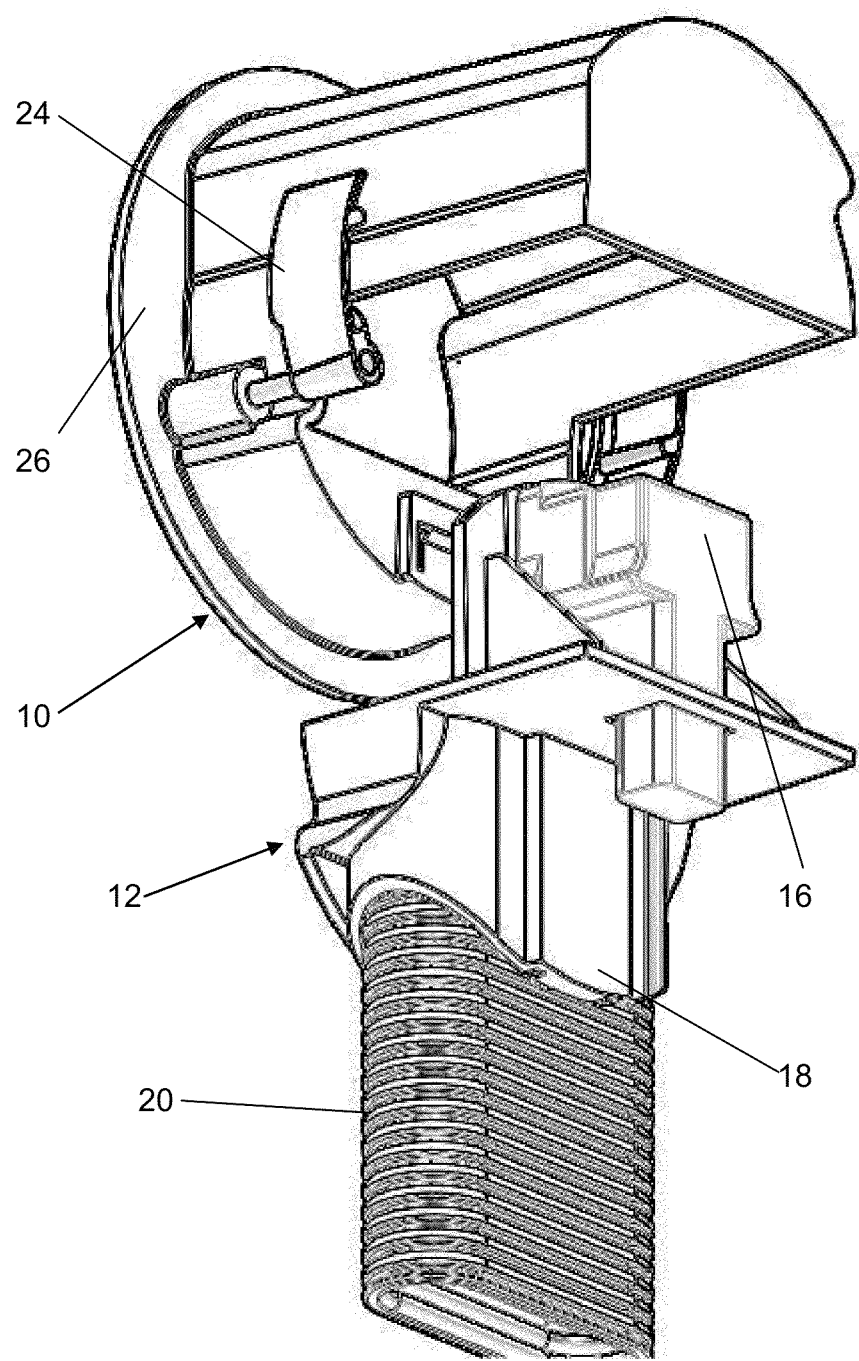
FIG. 7 is a rear perspective view of the upper electrical box with the electrical device and low voltage cable tube separated from the electrical box.
Figure 8A:
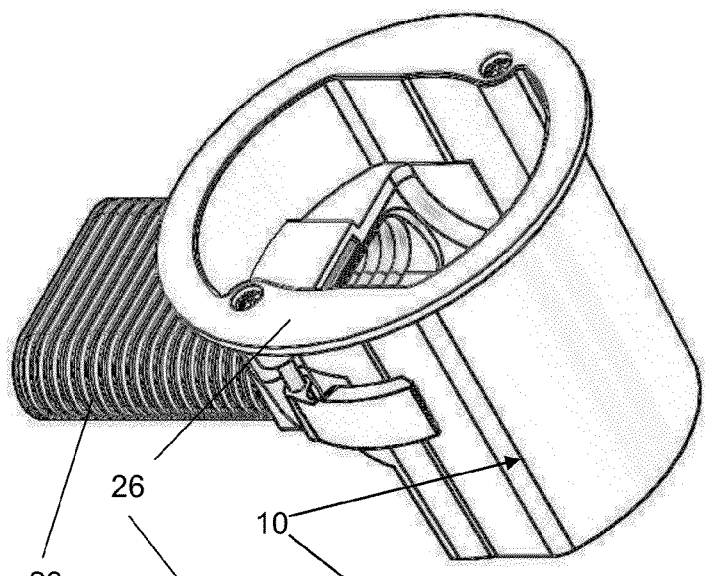
FIG. 8A is a perspective view of the upper electrical box in the assembled position.
Figure 8B:
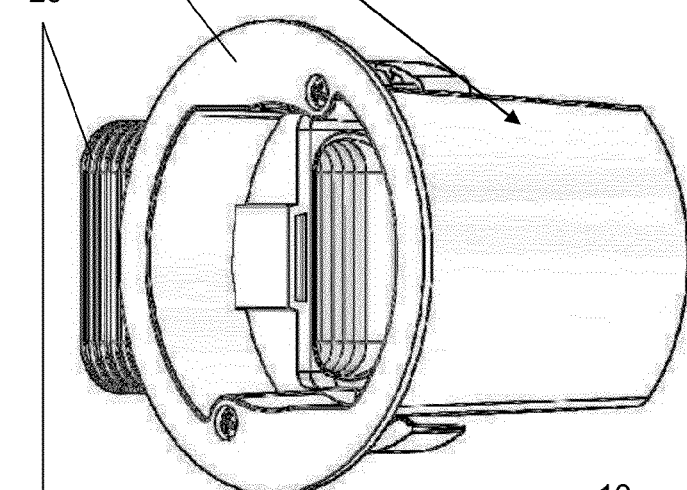
FIG. 8B is a top perspective view of the upper electrical box in the assembled position.
Figure 8C:
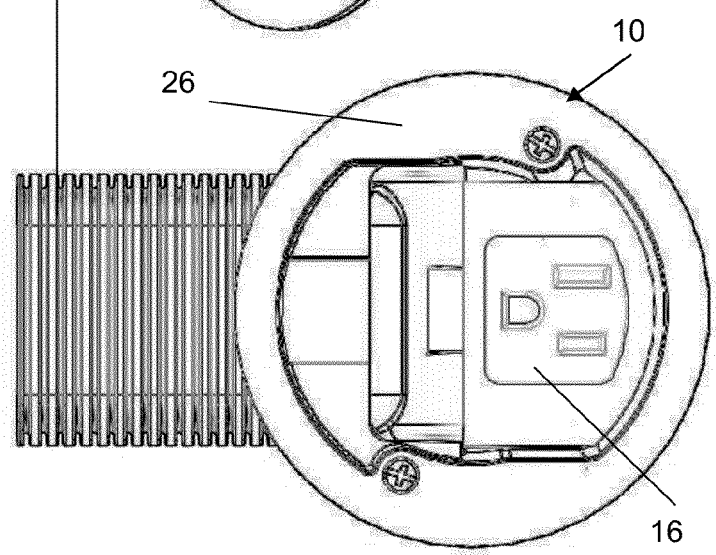
FIG. 8C is a front view of the upper electrical box in the assembled position.

FIGS. 6A through 6C illustrate various views of the upper electrical box 10 with the electrical cable 14 and low voltage cable tube 20 installed. As can be better seen in these views, upper electrical box 10 provides an airtight seal without any gaps where electrical outlet 16 and low voltage cable tube 20 meet the upper electrical box. Although not shown, any number of compressible seals or other suitable sealing members may be utilized to prevent airflow through the electrical boxes. Accordingly, when fully installed airflow will not transfer between the inner surface and outer surface of the wall where the electrical boxes are installed. Nevertheless, airflow will pass through the upper and lower electrical boxes via the low voltage cable tube since there will be an airtight passage there between to the conditioned air on the inside of the installation wall.

FIGS. 7 and 8A through 8C illustrate various views of the upper electrical box with similar features to those described above. In these views, the electrical cable 14 and low voltage cable tube 20 are connected to adapter 12 prior to mounting the adapter to the upper electrical box 10. As further seen in FIG. 7, a clip is positioned on a lower rear surface of electrical box 10 and provides for positive engagement between the upper electrical box 10 and adapter 12.

Figure 9:
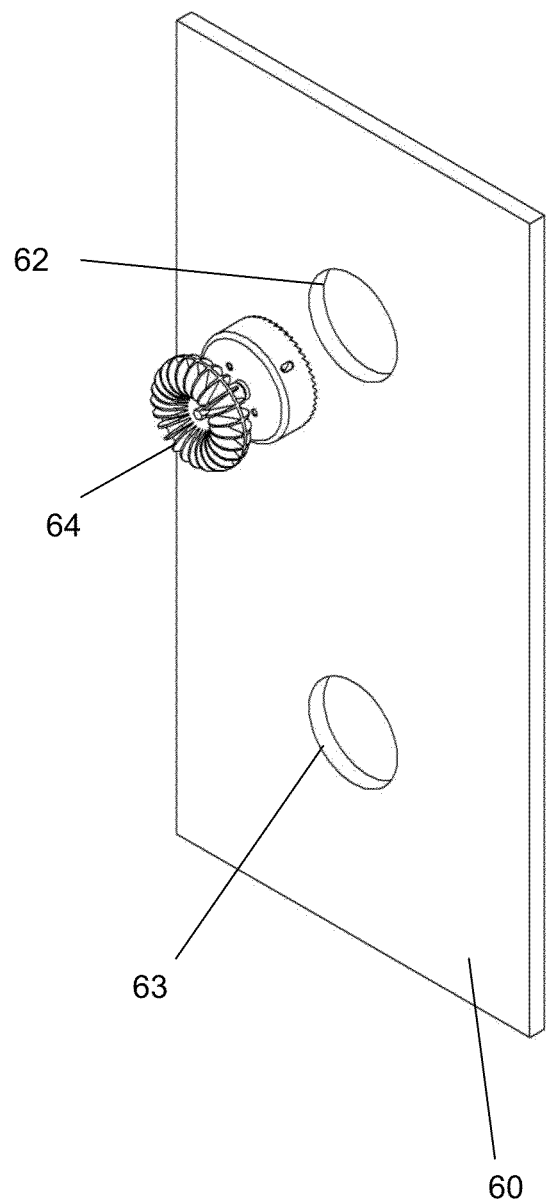
FIG. 9 is a perspective view of a hole saw being used to create two openings in a wall for installation of the through wall cable device.
Figure 10:
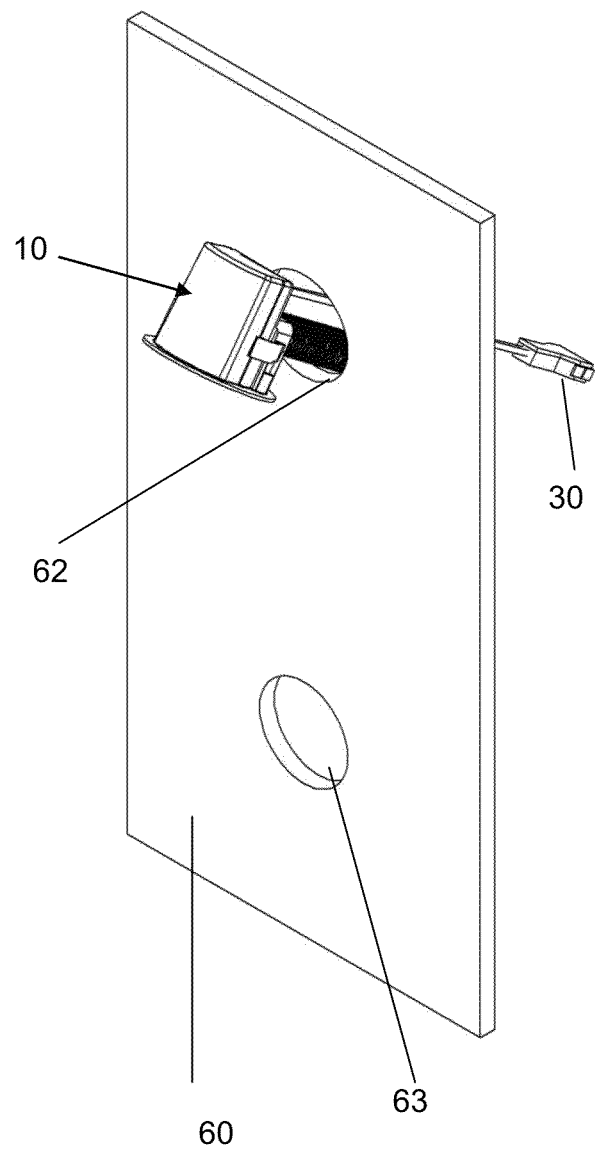
FIG. 10 is a perspective view of the upper electrical box with low voltage cable tube and electrical cable being inserted through an upper hole.
Figure 11:
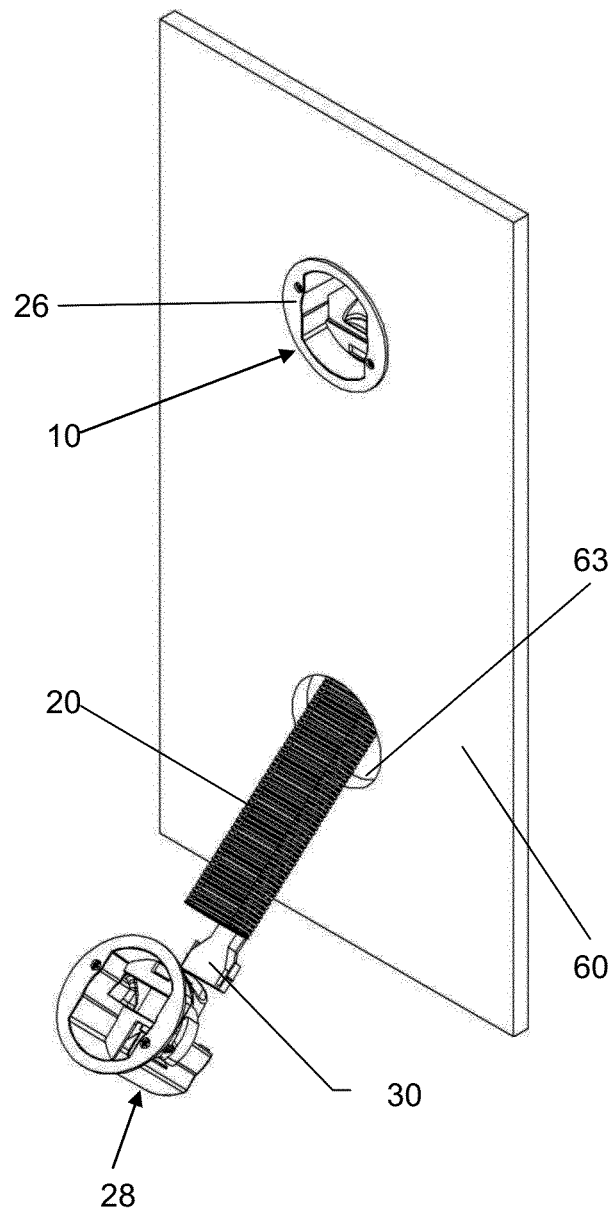
FIG. 11 illustrates the low voltage cable tube passing through a lower hole in the wall and adapted to be connected to the lower electrical cable.

FIGS. 9 through 12 illustrate one example of an installation procedure, although any number of suitable methods and steps may be utilized which are not necessarily disclosed. FIG. 9 illustrates a hole saw 64 being used to form two holes 62, 63 in the installation wall 60, with the upper hole 62 preferably positioned near the television or electrical device and the lower hole 63 preferably aligned with the upper hole 62 and near an already present electrical outlet or a location where an electrical outlet can be located. FIG. 10 illustrates the upper electrical box 10, electrical cable 14, and low voltage cable tube 20 being inserted through the upper hole 62. Alternatively, the low voltage cable tube 20 and electrical cable 14 may be inserted along through the upper hole 62 or inserted from the lower hole 63 upwards. FIG. 11 illustrates low voltage cable tube 20 and electrical cable 14 with connector 30 extending through the lower hole 63 and connecting the low voltage cable tube 20 and electrical cable 14 to lower electrical box 28 before the lower electrical box 28 is inserted into the lower hole 63.

Figure 12:
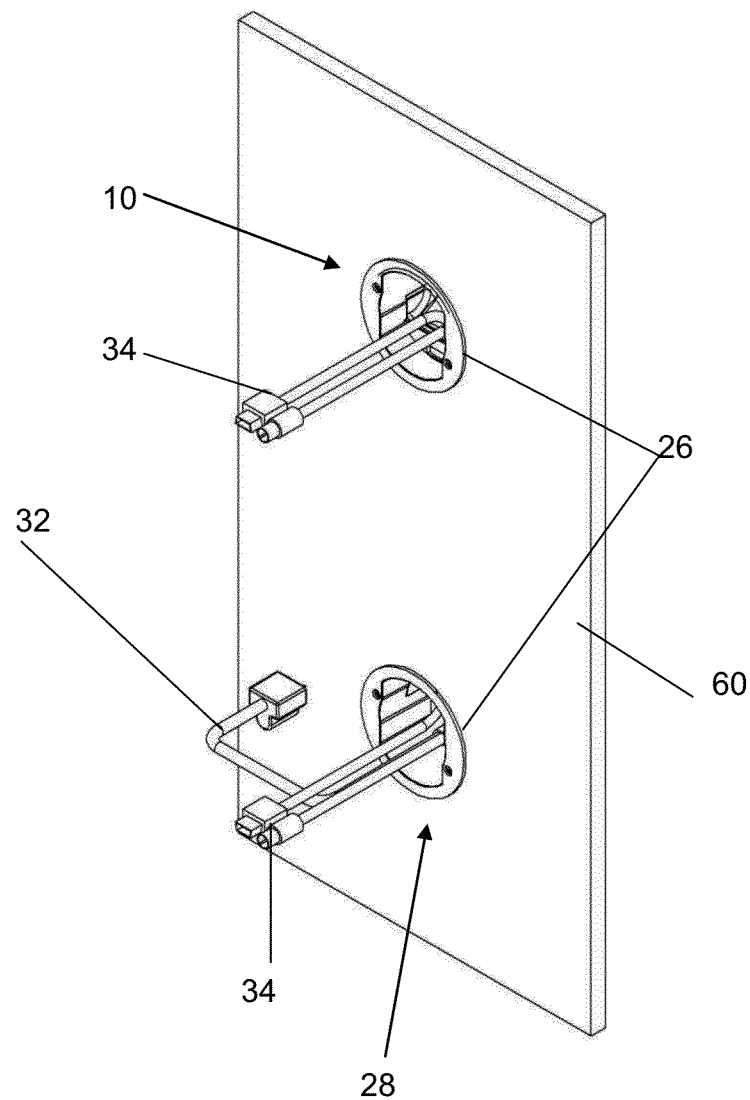
FIG. 12 illustrates the upper and lower electrical boxes in position and low voltage cables passing through both electrical boxes.

FIG. 12 illustrates the upper electrical box 10 and lower electrical box 28 installed in the wall with the electrical cable 14 providing electrical current from the lower electrical box 28 to the upper electrical box 10 and ultimately the electrical device without unsightly electrical cables being visible on the interior wall. In a similar fashion, low voltage cables 34 are shown passed through the upper and lower electrical boxes and the low voltage cable tube 20 (not shown in FIG. 12) to again provide communication between the upper and lower electrical boxes without the unsightly appearance of the cables extending down the wall. Accordingly, an airtight and cable free appearance is provided while still permitting the user to change, remove, or add additional low voltage cable lines. During installation, fish tape or another suitable device may be used to assist with positioning the hollow tube 20 or the electrical cable 14 behind the installation wall between the first electrical box 10 and the second electrical box 28.

The lower electrical box is preferably arranged with a receiving portion for attachment to a connector of a non-metallic (Romex®) style) cable that is maintained behind an interior wall. Advantageously, the lower electrical box may then have a permanently mounted electrical cord with a standard electrical plug or other suitable connector for providing electrical current to the lower electrical box. Specifically, the electrical cord can be inserted into a standard electrical outlet positioned near the lower electrical box at a traditional height (usually 12-16 inches from the floor). If the electrical cord is not long enough, an extension cord may be utilized to extend the reach of the electrical cord. In this arrangement, an extension cord and related expenses of the extension is not necessarily required for a standard installation of the through wall cable device. Further, a child cannot pull the electrical cord from the lower electrical box, thereby providing a safer alternative than traditional electrical cables.

In summary, the disclosed through wall electrical device provides an easy, efficient, and cheaper alternative way of providing electrical current and low voltage electrical communication to a wall-mounted television or other device without the clutter of cables hanging down the wall. Further, the device is airtight to be energy efficient and easy to install. To further enhance the airtight nature of the device, gaskets may be positioned between each electrical box and the hollow tube, the wall, or any pieces connected within the assembly to limit air infiltration into or out of the electrical boxes. The NM cable may include a snap-in connector at one or both ends which provides a simple and safe means to connect the electrical boxes on the high voltage side. The hollow tube may be a flexible conduit that is connected directly to both electrical boxes or may include an intermediate section to connect multiple pieces of hollow tube. Finally, the device is safer and allows the owner to provide a multitude of low voltage cables to the television without having to remove the electrical boxes once initially installed. This key advantage ensures that regardless if the television is changed, components (such as DVD players, Blu-Ray players, or receivers) are changed, or a new device is added, the user can easily and efficiently push the low voltage cables through the device without the hassle of removing and reinstalling the electrical boxes.

Figure 13:
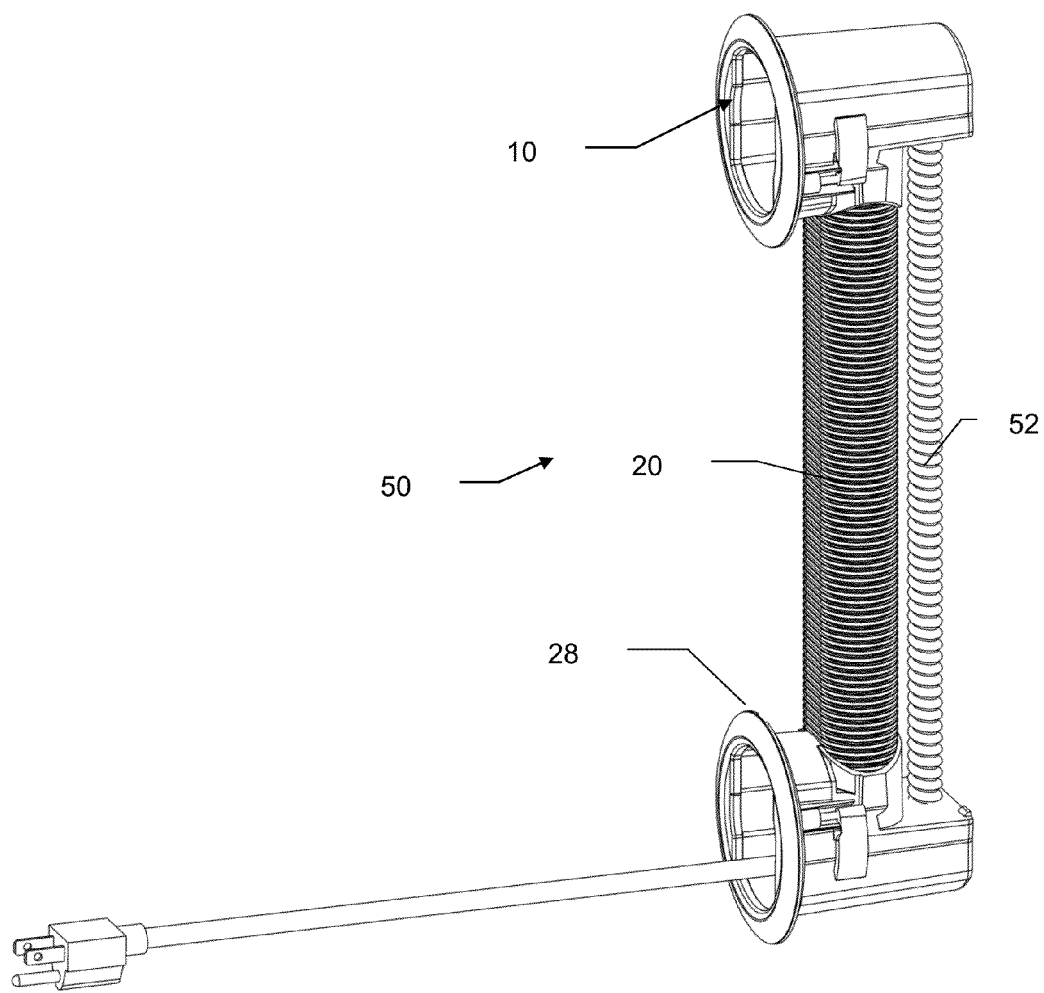
FIG. 13 illustrates the upper and lower electrical boxes in the fully assembled orientation with a metallic electrical cable connecting the electrical boxes.
Figure 14:
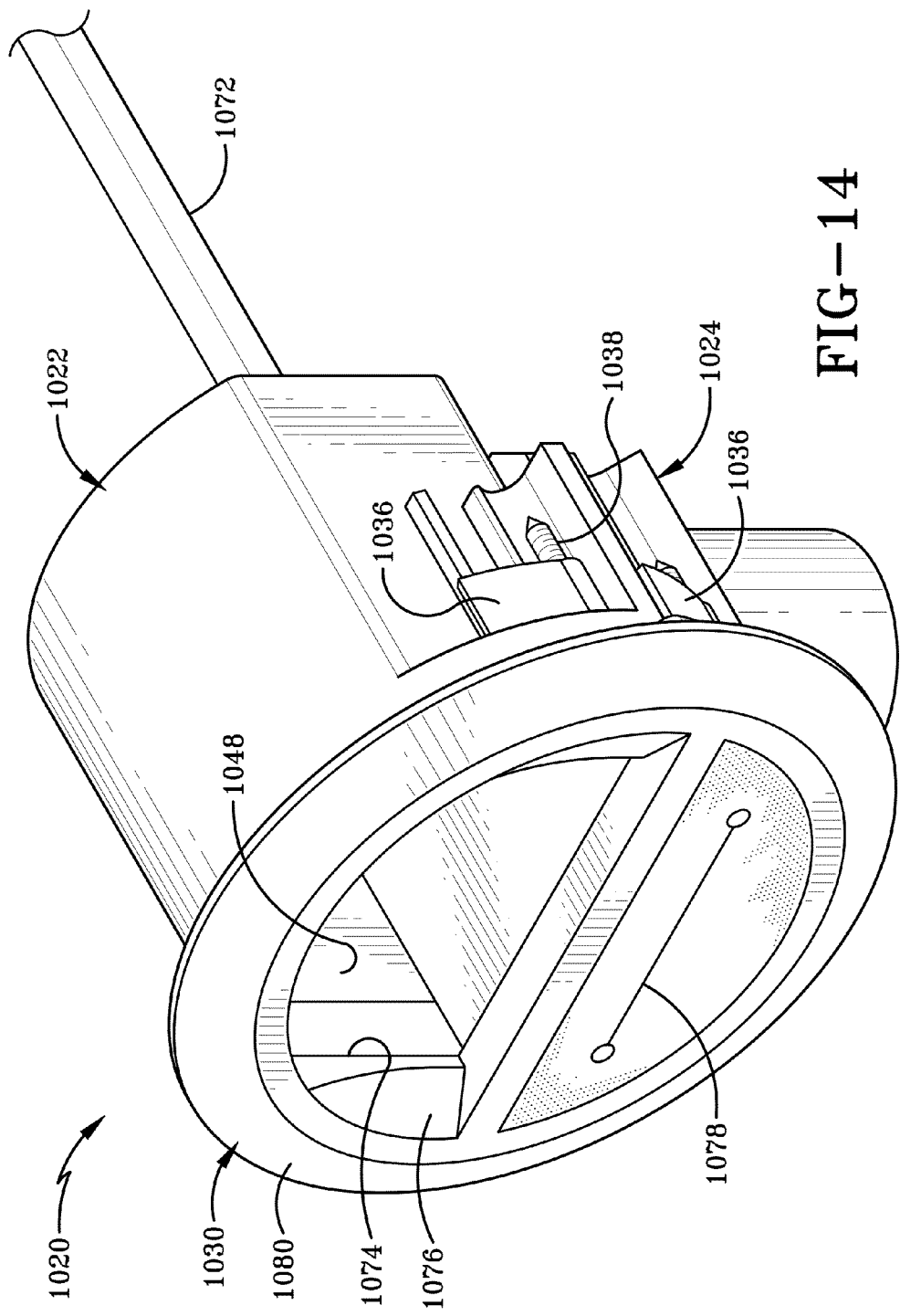
FIG. 14 is a perspective view of an upper through wall cable device with various components.

FIG. 13 illustrates another embodiment through wall electrical device 50 similar to that shown in FIGS. 1 through 8. Specifically, through wall electrical device 50 is structurally similar to through wall electrical device of FIGS. 1 through 8 with one key difference in the power supply mechanism between the upper electrical box 10 and the lower electrical box 28. The electrical cable 14 is replaced with a metallic electrical cable 52 and low voltage tube 20 may also be composed of a metal. Metallic electrical cable 52 maybe be secured to the upper and lower electrical boxes in any suitable way, including clamps or a recessed portion. The metallic electrical device 50 may be BX, MC, or Greenfield style. BX is a metallic sheath with a neutral wire and a hot wire therein, with the metal sheath functioning as the ground. MC includes a metallic sheath with a neutral wire, a hot wire, and a dedicated ground wire within the metallic sheath. Finally, Greenfield incorporates a metallic sheath without electrical wires therein so that the user can install their own wiring as needed. In each of these arrangements, the metallic cables may include a separate wire to connect to a ground for proper operation. In all aspects, it is generally preferable (but not always required) to have separate high voltage and low voltage tubes between the upper and lower electrical boxes. Nevertheless, it is within the spirit and scope of the present disclosure to share the same tube with separation between the low voltage portions and the high voltage portions.

FIGS. 14 through 17 illustrate various views of an upper through wall electrical device 1020. Through wall electrical device 1020 includes a high voltage box 1022 and a low voltage box 1024. A receptacle retainer 1026 is positionable within the high voltage box 1022 and secures an electrical receptacle 1028 (or electrical plug in the lower through wall electrical device 1021). A faceplate 1030 is positioned on the through wall electrical device to be more aesthetically pleasing and when necessary, may be sized to permit only low voltage cables to pass through when a high voltage cable is not being used. Gaskets 1032 and 1034 are positioned on a back side of the high voltage and low voltage electrical boxes while mounting flags 1036 are connected to the electrical box with mounting screws 1038.

High voltage box 1022 may include a flange 1040 forming a first interior cavity 1042 with recessed portions 1044 having apertures 1046 therein to receive mounting screws 1038. Accordingly, recessed portions 1044 are positioned inward and separate from flange 1040 to be more aesthetically pleasing and easier to operate by an installer. A second interior cavity 1048 is defined by the edges of recessed mounting portions 1044 and functions to receive an electrical cable receptacle or plug.

Low voltage box 1024 may include a flange 1050 forming a first interior cavity 1052 with recessed portions 1054 having apertures 1056 therein to receive mounting screws 1038. A second interior cavity 1058 is formed and bordered in part by recessed portions 1054 and advantageously allows easier installation. A cable cutout 1060 may be generally u-shaped or any other suitable shape and formed in a top wall 1062 of the low voltage electrical box 1024. Cable cutout 1060 is preferably positioned above a low voltage outlet 1064 which extends away from interior cavity 1058 and exits the low voltage electrical box 1024 at outlet 1066. As described in previous applications to Applicants, a hollow tube may be connected to outlet 1066, as seen in previous figures, so that a sealed environment can be achieved behind an interior wall and permit low voltage cables to pass from the upper through wall electrical device and the lower through wall electrical device. Accordingly, when high voltage electrical box 1022 is removed from the interior wall, low voltage cables can extend through cutout 1060 and into low voltage outlet 1064 in a nearly vertical fashion such that installation of low voltage cables is significantly easier and the high voltage electrical box 1022 may then be reinstalled to close off the interior space. In one aspect, both the high voltage and low voltage electrical boxes may be composed of a plastic or other suitable material and may be white, brown, clear, or any other suitable color. It has been discovered that a clear low voltage electrical box can be helpful for installation purposes to properly align and insert low voltage cables.

Figure 18:
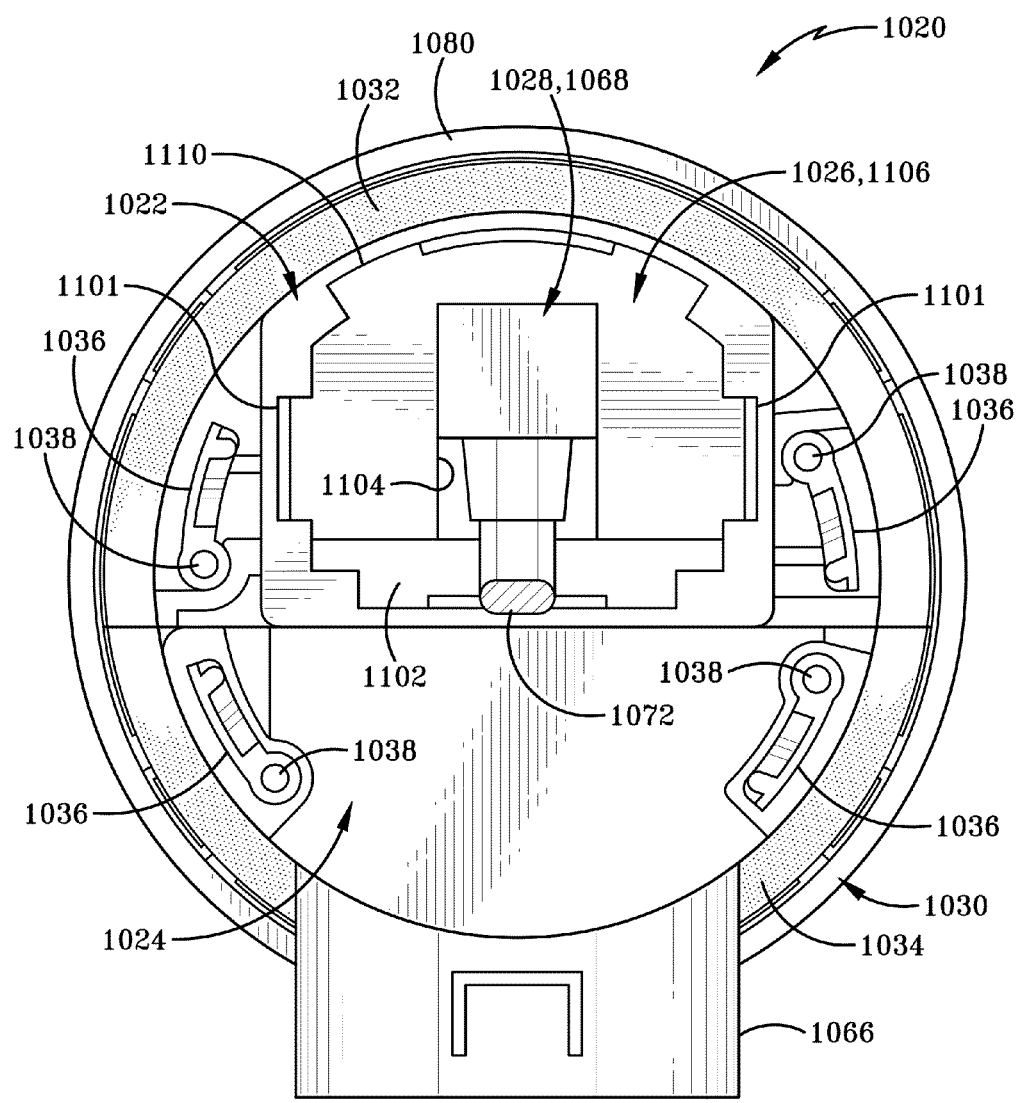
FIG. 18 is a rear view of the upper through wall cable device.

FIG. 18 illustrates a rear view of the upper through wall electrical device 1020 with electrical receptacle 1028 therein with a rear surface 1068 of the electrical receptacle extending rearward and beyond the high voltage electrical box 1022. Specifically, electrical receptacle 1028 is positioned within receptacle retainer 1026 with a rear wall 1106 exposed. As can be seen, the upper through wall electrical device 1020 with high voltage electrical box 1022 and low voltage electrical box 1024 together form two sealed regions for securing high voltage electrical cables and low voltage electrical cables separately.

Figure 19:
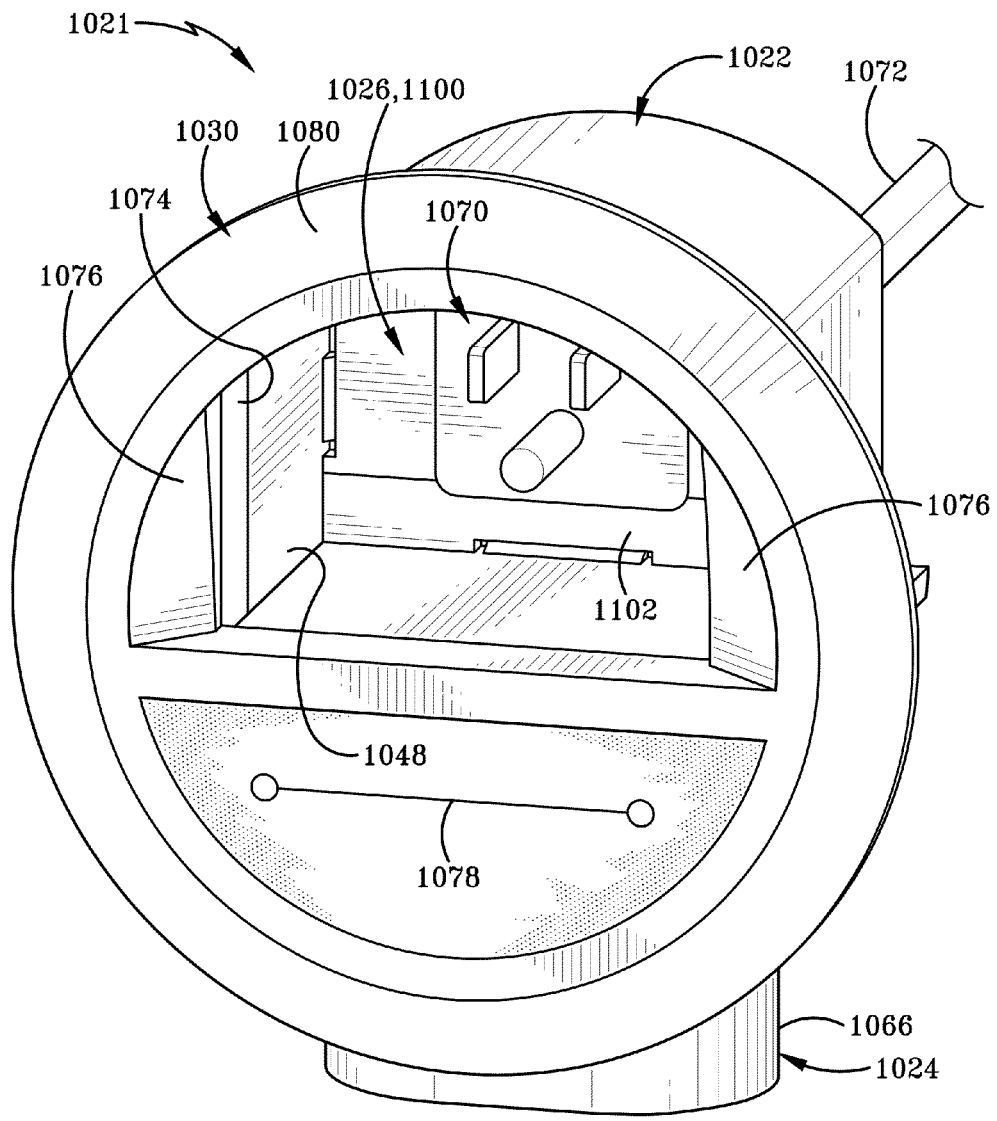
FIG. 19 is a front perspective view of a lower through wall cable device.

FIG. 19 illustrates the lower through wall electrical device 1021 which is structurally and functionally identical to the upper through wall electrical device 1020 with one distinct exception. Specifically, electrical receptacle 28 has been replaced with electrical plug 1070 such that a standard electrical cord or extension cord can be used to connect the lower through wall electrical device 1021 and also upper through wall electrical device 1020 with a high voltage current. Although now shown, an NM or Romex cable 1072 extends between the electrical receptacle 1028 and the electrical plug 1070 to provide electrical current to the upper through wall electrical device and thereby operate an electrical device connected thereto. As can also be seen in FIG. 19, faceplate 1030 may include an opening 1074 with angled walls 1076 therein to receive the high voltage electrical cable, while a slotted opening 1078 can pass the low voltage cables to the low voltage electrical box. Finally, a flange 1080 surrounds the faceplate and snaps onto the upper and lower through wall electrical devices once mounted in the interior wall.

Figure 20:
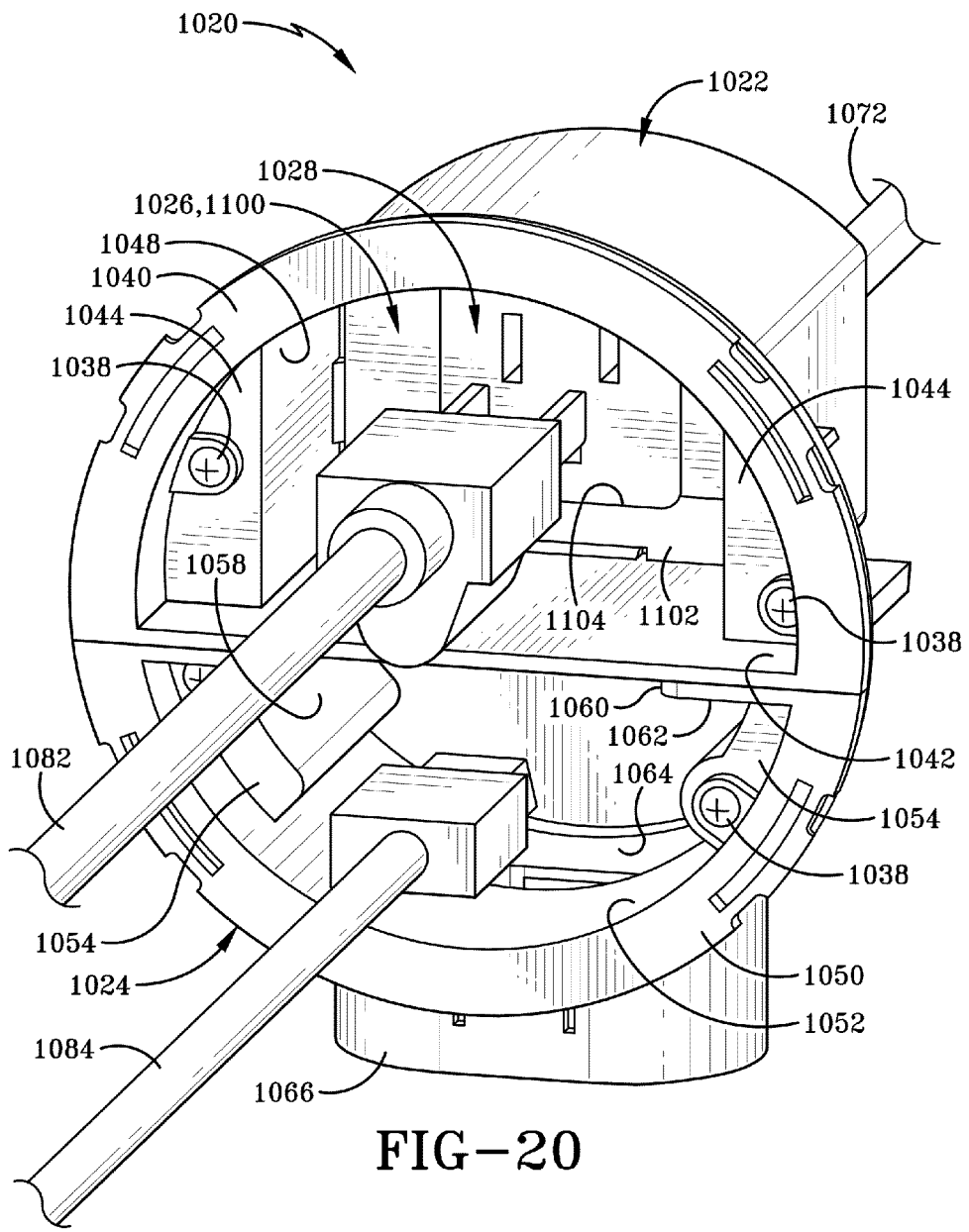
FIG. 20 is a front perspective view of the upper through wall cable device with high voltage and low voltage cables being inserted.

FIG. 20 illustrates the upper through wall electrical device 1020 with a high voltage electrical cable and plug 1082 being inserted into high voltage electrical box 1022, while a low voltage cable 1084, such as an HDMI cable, being inserted into low voltage electrical box 1024. In this manner, once the upper and lower through wall electrical devices 1020, 1021 are installed, any number of low voltage cables may be inserted through the appropriate low voltage electrical box and openings to a low voltage electrical signal from a device near the lower though wall electrical device to a television or other device near the upper through wall electrical device.

Figure 21:
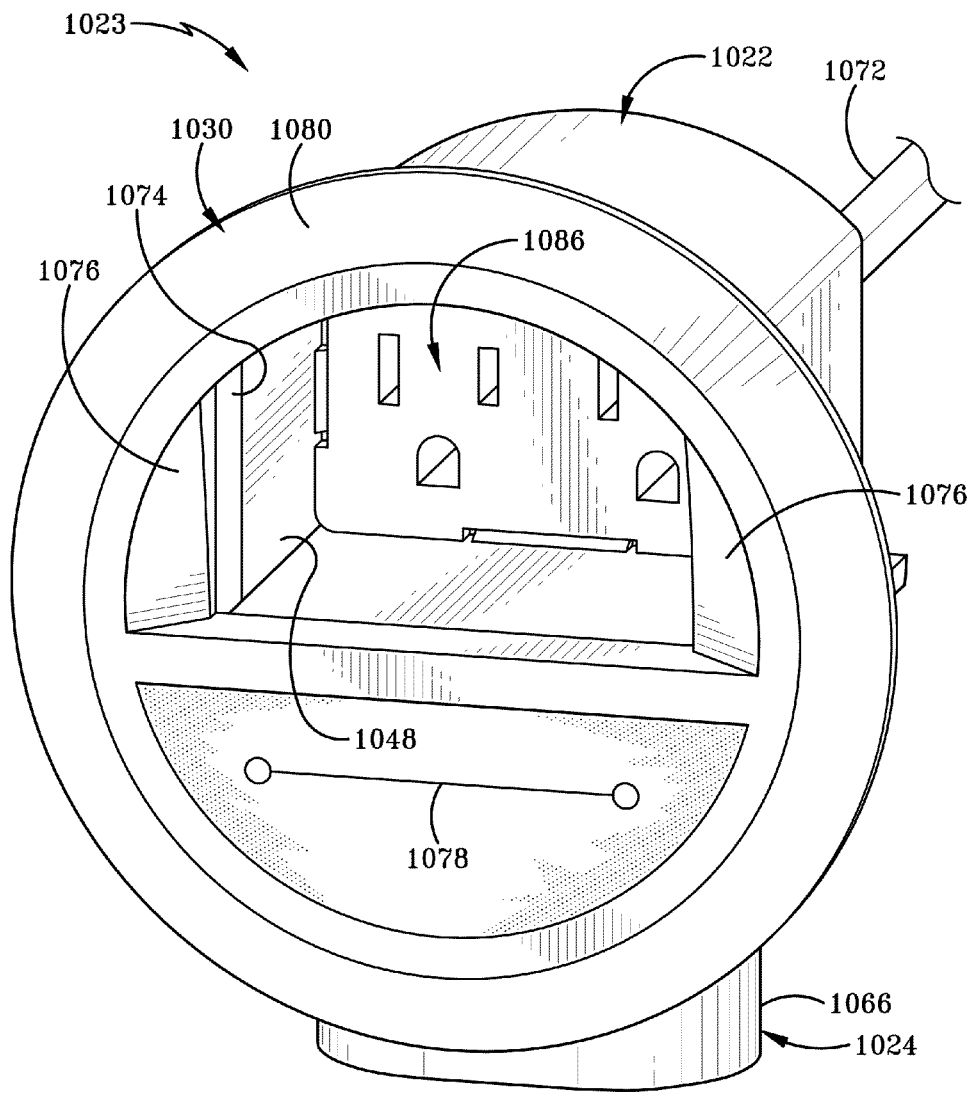
FIG. 21 is a front perspective view of the upper through wall cable device with two high voltage receptacles.

FIG. 21 illustrates a second aspect upper through wall electrical device 1023 having a structure similar to upper through wall electrical device 1020 with an electrical receptacle 1086 having two or more electrical contact receiving regions. In this manner, more than on electrical device can be connected to high voltage at the upper through wall electrical device. Further, receptacle retainer 1026 may be modified to secure the two or more receptacle arrangement, or the electrical receptacle may be designed and manufactured such that it replaces the receptacle retainer 1026 as may be appropriate. Finally, the user may decide to add additional or remove extra electrical receptacles. As will be seen, the receptacle retainers may be changed or adapted to secure one, two, three, or more electrical plugs and/or receptacles without buying new high voltage electrical boxes.

Figure 15:
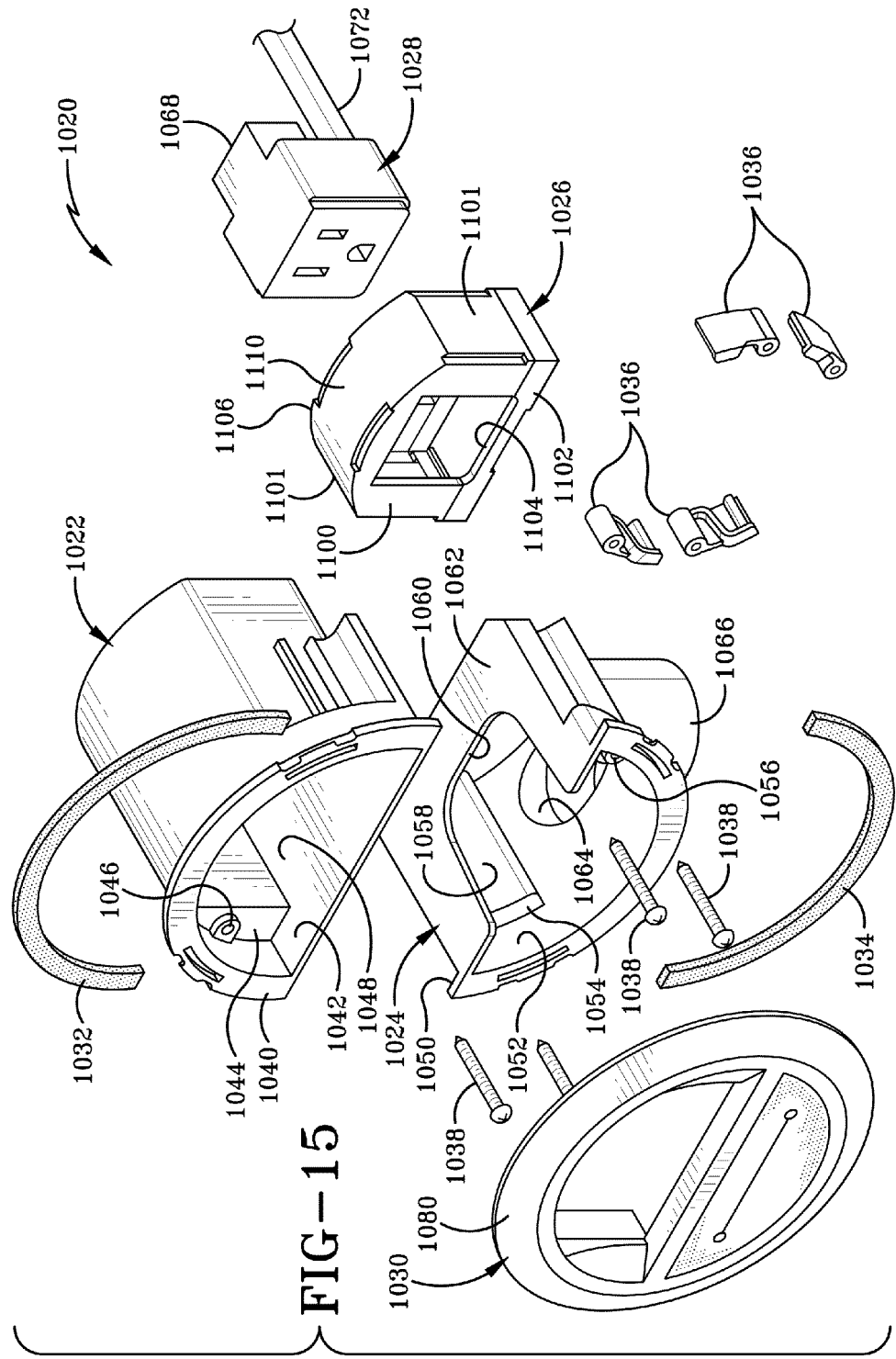
FIG. 15 is an exploded perspective view of the upper through wall cable device with various components.
Figure 16:
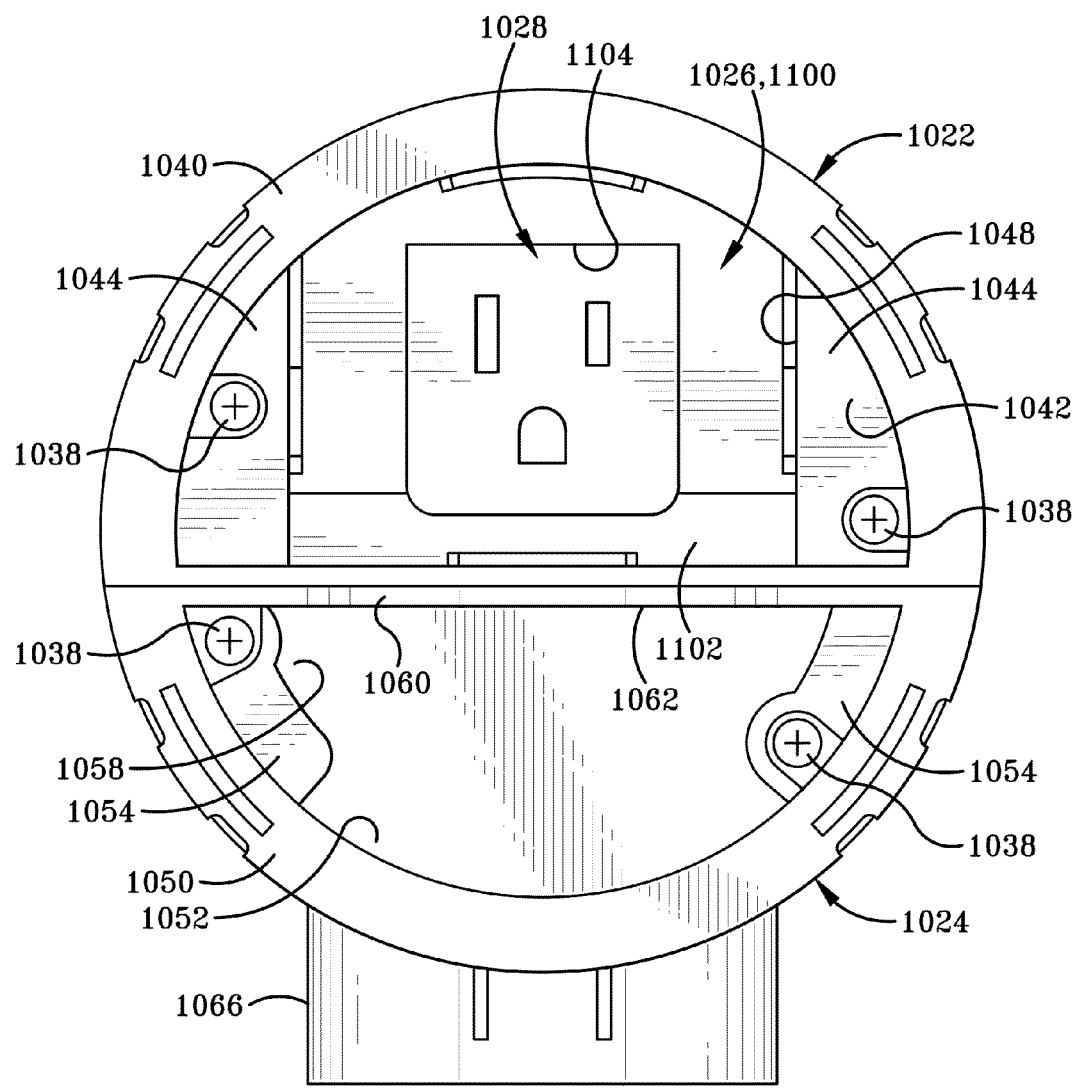
FIG. 16 is a front view of the upper through wall cable device.
Figure 17:
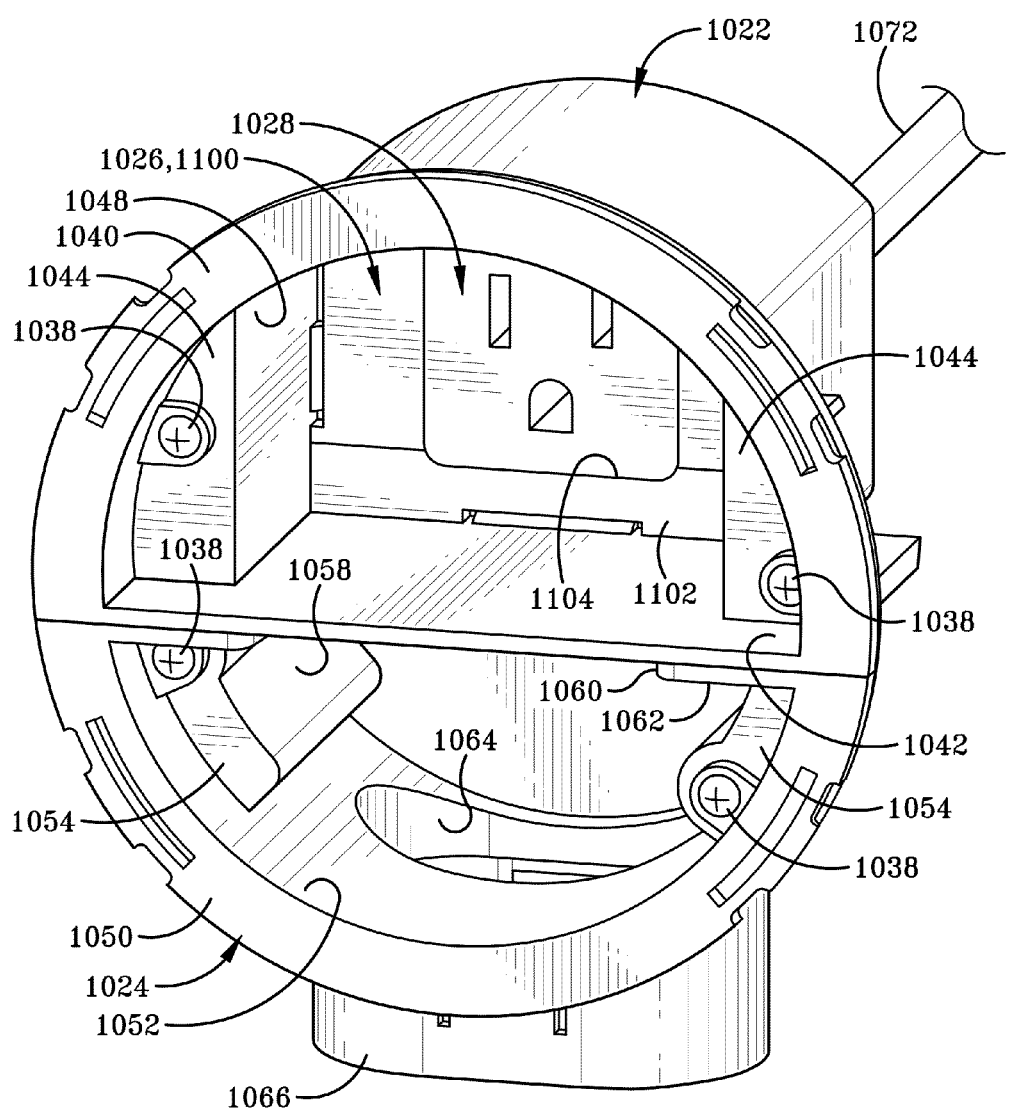
FIG. 17 is a front perspective view of the upper through wall cable device.

FIGS. 22 through 24 illustrate the structure of receptacle retainer 1026 with electrical receptacle 1028 positioned therein. Receptacle retainer 1026 is secured within high voltage electrical box 1022 at side walls 1101 and is particularly secured at the recesses on each end of side walls 1101. The receptacle retainer may include a front wall 1100 with an aperture 1104, a hinged bottom wall 1102, rear wall 1106 with an aperture 1104, and a top wall 1110. Both bottom wall 1102 and top wall 1110 may each include recesses which are used to securing the receptacle retainer within the electrical box during assembly such that the receptacle retainer can withstand the forces or electrical plug insertion and removal. The bottom wall 1102 may include a connector 1114 which is secured to a tab 1112 on side wall 1101. Specifically, when the electrical receptacle 1028 is positioned within apertures 1104, the bottom wall 1102 can be secured around the electrical receptacle and prevents the receptacle from moving. As can be seen in FIG. 15, the electrical receptacle 1028 has a generally square shape and is complimentary sized and shaped to fit securely within the receptacle retainer 1026. Further, it should be appreciated that electrical receptacle 1028 can be replaced with electrical plug 1070 such that receptacle retainer 1026 is a common part to both the upper and lower through wall electrical devices.

Figure 25:
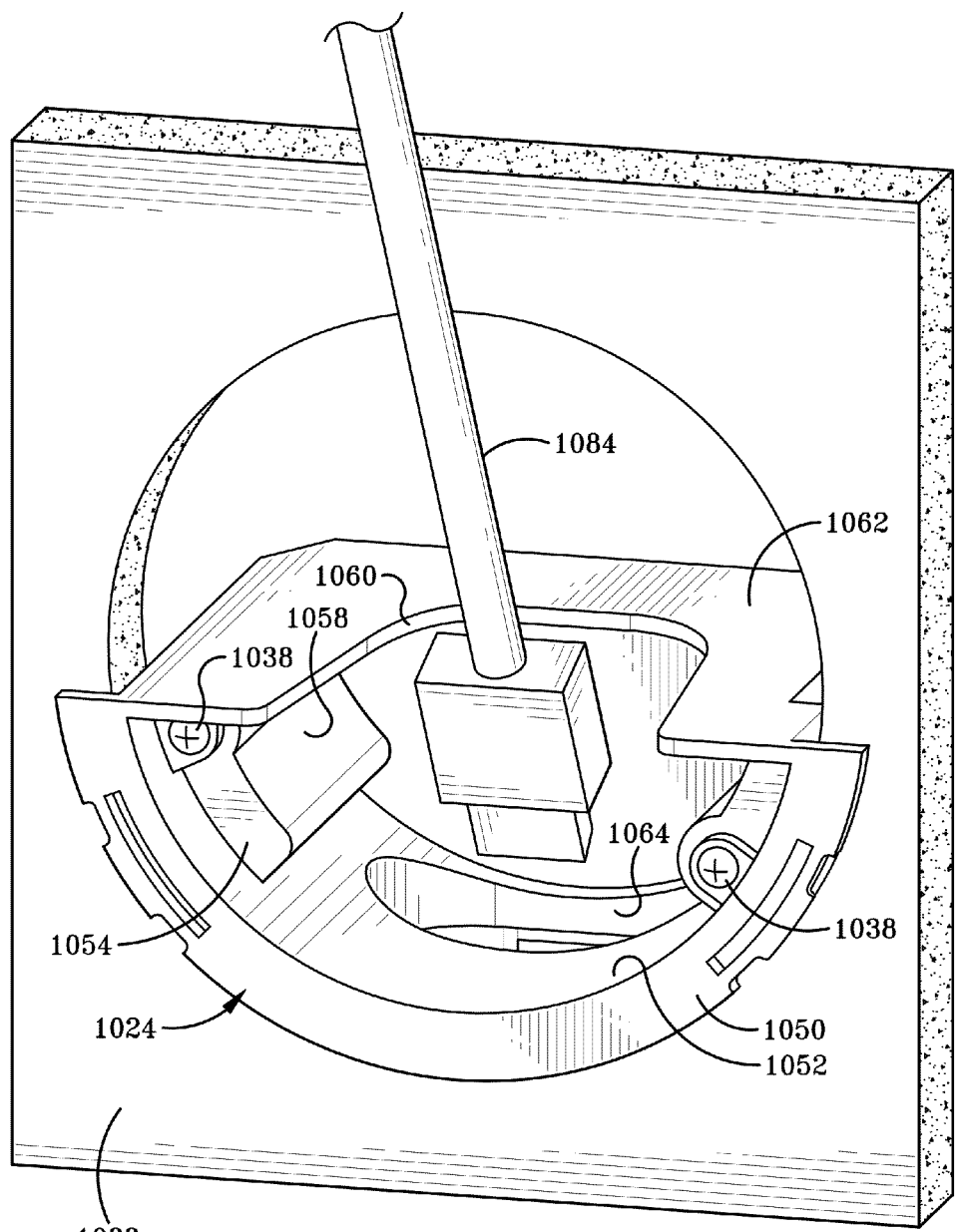
FIG. 25 illustrates the low voltage electrical box of the through wall cable device installed in a wall and low voltage cables being inserted therein.

FIG. 25 illustrates the high voltage electrical box removed and the low voltage electrical box 1024 positioned within interior wall 1088 and secured with mounting flags. With the high voltage electrical box removed, the user can easily insert low voltage cables into the low voltage electrical box in almost a vertical orientation through cutout 1060 and into low voltage outlet 1064 to traverse the cable to and through the lower through wall electrical device such that the cable is hidden behind the wall in a hollow tube to prevent air loss. After this is completed, the high voltage electrical box 1022 may be installed or re-installed if it was already previously installed. In this manner, the combined high voltage and low voltage electrical boxes provide the appearance of a single electrical box but provide a unique and novel method to easily and quickly install or remove low voltage cables.

Without being limited to the process described herein, an exemplary installation method will be described, but other suitable methods may be utilized without departing from the spirit and scope of the present disclosure. In operation, the user first cuts two holes (one for the upper through wall device and one for the lower through wall device) in the wall with a hole saw or other suitable device. Next, either the high voltage or the low voltage electrical boxes may be installed. In one aspect, the upper and lower low voltage electrical boxes are installed with a hollow tube connecting both low voltage electrical boxes. The low voltage electrical boxes may be secured within the bottom portion of the upper hole and the upper portion of the bottom hole with mounting screws and mounting flags as described above. It may be advantageous to connect the hollow tube to the upper low voltage electrical box and then insert the upper low voltage electrical box and tube through the upper hole. The lower low voltage electrical box can then be connected to the hollow tube and the user can then secure the lower low voltage electrical box with mounting flags and mounting screws. Once completed, the user may elect to fish all the low voltage cables through the upper low voltage electrical box, hollow tube, and lower low voltage electrical box. Next, the high voltage electrical boxes are installed, with the upper high voltage electrical box installed first and the NM cable extending downwards and adjacent the lower hole so that it can be connected to and inserted into the lower high voltage electrical box. Once the electrical receptacle and electrical plugs are secured within the high voltage electrical boxes, the high voltage electrical boxes can be secured adjacent the low voltage electrical boxes with mounting flags and screws. Next, the faceplate may be secured over the combined upper or lower electrical boxes to create the appearance of a single electrical box. Finally, the electrical devices may be connected to high voltage or low voltage as appropriate.

While not specifically shown, it is within the spirit and scope to incorporate the hollow tube of FIGS. 1-13 into the through wall electrical device of FIGS. 14-25 and specifically connect the two outlets 66 with the hollow tube to allow free passage of low voltage cables within the tube and between the upper and lower low voltage electrical boxes.

In summary, the disclosed through wall electrical device provides an easy, efficient, and cheaper alternative way of providing electrical current and low voltage electrical communication to a wall-mounted television or other device without the clutter of cables hanging down the wall. Further, the device is airtight to be energy efficient and easy to install. To further enhance the airtight nature of the device, gaskets may be positioned between each electrical box and the hollow tube, the wall, or any pieces connected within the assembly to limit air infiltration into or out of the electrical boxes. The NM cable may include a snap-in connector at one or both ends which provides a simple and safe means to connect the electrical boxes on the high voltage side. The hollow tube may be a flexible conduit that is connected directly to both electrical boxes or may include an intermediate section to connect multiple pieces of hollow tube. Finally, the device is safer and allows the owner to provide a multitude of low voltage cables to the television without having to remove the electrical boxes once initially installed. This key advantage ensures that regardless if the television is changed, components (such as DVD players, Blu-Ray players, or receivers) are changed, or a new device is added, the user can easily and efficiently push the low voltage cables through the device without the hassle of removing and reinstalling the electrical boxes.

It will be understood that implementations are not limited to the specific components disclosed herein, as virtually any components consistent with the intended operation of a method and/or system implementation for a through wall electrical device may be utilized. Components may comprise any shape, size, style, type, model, version, class, grade, measurement, concentration, material, weight, quantity, and/or the like consistent with the intended operation of a method and/or system implementation for a through wall electrical device.

The concepts disclosed herein are not limited to the specific implementations shown herein. For example, it is specifically contemplated that the components included in a particular implementation of a through wall electrical device may be formed of any of many different types of materials or combinations that can readily be formed into shaped objects and that are consistent with the intended operation of a through wall electrical device. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, embodiments of the through wall electrical device may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular implementations of a through wall electrical device, it should be readily apparent that a number of modifications may be made without departing from the spirit thereof and that these implementations may be applied to other through wall electrical devices. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

We claim:

1. A through wall electrical device comprising:
   an upper high voltage electrical box, an upper low voltage electrical box, a lower high voltage electrical box, and a lower low voltage electrical box;
   the upper and lower high voltage electrical boxes having a straight perimeter wall surface;
   the upper and lower low voltage electrical boxes having a straight perimeter wall surface;
   wherein the upper high voltage electrical box straight perimeter wall surface and the upper low voltage electrical box straight perimeter wall surface are positioned adjacent each other upon installation and together form a generally round upper electrical box;
   wherein the lower high voltage electrical box straight perimeter wall surface and the lower low voltage electrical box straight perimeter wall surface are positioned adjacent each other upon installation and together form a generally round lower electrical box; and,
   a hollow tube connecting the upper low voltage electrical box and the lower low voltage electrical box.

2. The through wall electrical device of claim 1 wherein the upper low voltage electrical box further comprises a cutout in the straight perimeter wall surface.

3. The through wall electrical device of claim 2 wherein the cutout extends rearward at least partially above a low voltage electrical box outlet.

4. The through wall electrical device of claim 2 wherein the cutout is not visible when the upper high voltage electrical box and the upper low voltage electrical boxes are installed.

5. The through wall electrical device of claim 1 wherein the upper low voltage electrical box is clear.

6. The through wall electrical device of claim 1 wherein the upper high voltage electrical box is clear.

7. The through wall electrical device of claim 1 wherein the upper low voltage electrical box and the upper high voltage electrical box are each half-round electrical boxes.

8. The through wall electrical device of claim 1 further comprising a recessed mounting portion for securing the upper low voltage electrical box and the upper high voltage electrical box to a wall.

9. The through wall electrical device of claim 8 wherein the recessed mounting portions are disconnected from a front surface flange.

10. The through wall electrical device of claim 1 further comprising a faceplate securable to a flange of the upper high voltage electrical box and the upper low voltage electrical box.

11. The through wall electrical device of claim 10 wherein the faceplate further comprises a high voltage opening and a low voltage opening.

12. The through wall electrical device of claim 1 wherein the upper and lower high voltage electrical boxes are removable without impacting the upper and lower low voltage electrical boxes.

13. The through wall electrical device of claim 1 wherein the upper high voltage electrical box is positioned above the upper low voltage electrical box.

14. A method of providing a cable passage comprising the steps of:
   mounting an upper low voltage electrical box having a straight perimeter wall surface in an installation wall with a hollow tube positioned behind the installation wall and connected to the hollow tube;
   mounting a lower low voltage electrical box having a straight perimeter wall surface in the installation wall and connected to the hollow tube;
   mounting an upper high voltage electrical box having a straight perimeter wall surface in the installation wall adjacent the upper low voltage electrical box with the straight perimeter wall surfaces adjacent each other and the upper low voltage electrical box and the upper high voltage electrical boxes together forming a generally round upper electrical box; and,
   mounting a lower high voltage electrical box having a straight perimeter wall surface in the installation wall adjacent the lower low voltage electrical box with the straight perimeter wall surfaces adjacent each other and the lower low voltage electrical box and the lower high voltage electrical boxes together forming a generally round lower electrical box.

15. The method of providing a cable passage of claim 14 further comprising the step of inserting a cable through the upper and lower low voltage electrical boxes before installing the upper and lower high voltage electrical boxes.

16. The method of claim 14 further comprising the step of connecting the lower high voltage electrical box to an electrical current source.

* * * * *